(12) United States Patent
Wang et al.

(10) Patent No.: US 11,620,849 B2
(45) Date of Patent: Apr. 4, 2023

(54) SPECTRAL IMAGING CHIP AND APPARATUS, INFORMATION PROCESSING METHOD, FINGERPRINT LIVING BODY IDENTIFICATION DEVICE AND FINGERPRINT MODULE

(71) Applicant: BEIJING SEETRUM TECHNOLOGY CO., LTD., Beijing (CN)

(72) Inventors: Yu Wang, Beijing (CN); Zhilei Huang, Beijing (CN)

(73) Assignee: BEIJING SEETRUM TECHNOLOGY CO., LTD., Haidian District (CN)

( * ) Notice: Subject to any disclaimer, the term of this patent is extended or adjusted under 35 U.S.C. 154(b) by 0 days.

(21) Appl. No.: 17/527,441

(22) Filed: Nov. 16, 2021

(65) Prior Publication Data

US 2022/0156479 A1 May 19, 2022

(30) Foreign Application Priority Data

| Nov. 18, 2020 | (CN) | ............................. | 202011295429 |
| Nov. 18, 2020 | (CN) | ............................. | 202011299082 |
| Feb. 5, 2021 | (CN) | ............................. | 202110161799 |

(51) Int. Cl.
*G06V 40/13* (2022.01)
*G01J 3/28* (2006.01)
*G06V 40/12* (2022.01)

(52) U.S. Cl.
CPC ........ *G06V 40/1318* (2022.01); *G01J 3/2823* (2013.01); *G06V 40/1382* (2022.01)

(58) Field of Classification Search
CPC .......... G06V 40/1318; G06V 40/1382; G06V 10/143; G06V 10/147; G06V 10/54;
(Continued)

(56) References Cited

U.S. PATENT DOCUMENTS

| 2008/0181466 | A1* | 7/2008 | Iizuka | .................... | G06V 40/13 |
| | | | | | 340/5.82 |
| 2016/0209271 | A1 | 7/2016 | Rowlette et al. | | |

(Continued)

FOREIGN PATENT DOCUMENTS

| CN | 107022222 A | 1/2018 |
| CN | 111464700 A | 7/2020 |

(Continued)

*Primary Examiner* — Roberto W Flores
(74) *Attorney, Agent, or Firm* — Birch, Stewart, Kolasch & Birch, LLP

(57) ABSTRACT

The present disclosure provides a spectral imaging chip and apparatus, an information processing method, a fingerprint living body identification device and a fingerprint module. The spectral imaging chip can obtain spectral information of a captured object without affecting the spatial resolution and imaging quality of the resulting image, which is convenient for grasping more comprehensive information of the object to be imaged. The fingerprint living body identification device and fingerprint module can realize fingerprint living body identification through the spectral imaging chip, which is advantageous to improve the stability of the component performance, while reducing the volume, weight and cost of the spectral components, greatly improving the anti-counterfeiting ability of the fingerprint identification system.

20 Claims, 14 Drawing Sheets

(58) Field of Classification Search
CPC ...... G06V 10/60; G06V 10/774; G06V 10/82;
G06V 40/12–1394; G01J 3/2823; G01J
3/51; G01J 2003/1213; G01J 2003/2806;
G01J 2003/2826; G01J 2003/283; G01J
2003/284; G01J 3/0205; G01J 3/0229;
G01J 3/0259; G01J 3/0208; B82Y 20/00;
A61B 5/7264; A61B 5/1455; A61B
5/0075; A61B 5/1172; A61B 2562/0233;
A61B 2562/0238; G61B 5/1455; G61B
5/0075; H01L 27/14603; H01L 27/14625;
G06F 3/041–047

See application file for complete search history.

(56) References Cited

U.S. PATENT DOCUMENTS

| | | | |
|---|---|---|---|
| 2017/0083779 A1* | 3/2017 | Hung | A61B 5/1172 |
| 2017/0323139 A1 | 11/2017 | Wu et al. | |
| 2018/0349889 A1 | 12/2018 | Glaser | |
| 2019/0026523 A1* | 1/2019 | Shen | H01L 51/5281 |
| 2019/0333198 A1* | 10/2019 | Wang | G06T 5/50 |
| 2022/0061672 A1* | 3/2022 | Cui | A61B 5/14532 |
| 2022/0085891 A1* | 3/2022 | Cui | H04B 10/516 |
| 2022/0178748 A1* | 6/2022 | Cui | G02B 1/002 |

FOREIGN PATENT DOCUMENTS

| | | |
|---|---|---|
| CN | 111490060 A | 8/2020 |
| CN | 111505820 A | 8/2020 |
| CN | 211828773 U | 10/2020 |

* cited by examiner

SPECTRAL IMAGING CHIP AND APPARATUS, INFORMATION PROCESSING METHOD, FINGERPRINT LIVING BODY IDENTIFICATION DEVICE AND FINGERPRINT MODULE

CROSS-REFERENCE TO RELATED APPLICATIONS

The present application claims the priority of Chinese invention patent application No. 202011299082.6, filed with the Chinese Patent Office on Nov. 18, 2020; Chinese invention patent application No. 202011295429.X, to filed with the Chinese Patent Office on Nov. 18, 2020; and Chinese invention patent application No. 202110161799.2, filed with the Chinese Patent Office on Feb. 5, 2021, the entire contents of which are incorporated herein by reference.

TECHNICAL FIELD

The present disclosure relates to the technical field of imaging, and in particular to a spectral imaging chip, a spectral imaging apparatus and an information processing method for the same, and a fingerprint living body identification device and a fingerprint module to which the spectral imaging chip and the information processing method are applied.

BACKGROUND

At present, imaging chips and imaging apparatuses are widely used. Taking a camera as an example, it includes an image sensor (for example, a CMOS image sensor or a CCD sensor) to obtain image information of a captured object, for example, RGB color information of the captured object.

However, no matter whether the CMOS image sensor or the CCD sensor is used as an imaging chip, it can only obtain the image information of the captured object, but cannot obtain spectral information of the captured object. That is, the imaging chips and imaging apparatuses in the prior art cannot obtain the spectral information of the object, so that the obtained image cannot be widely used in the scenes such as intelligent AI recognition and qualitative and quantitative analysis of substance components that require the spectral information of the object as data support.

In addition, in the modern information society, there are a large number of scenes that require users to perform fingerprint authentication in daily life, which greatly improves the convenience of people's lives.

In the prior art, the fingerprint image information is often used to verify whether a user is himself or herself, but this type of technology can be cracked through stickers, 3D printed models and the like, so that its security cannot be ensured.

SUMMARY

An advantage of the present application is to provide a spectral imaging chip and a preparation method and information processing method for the same, wherein the spectral imaging chip can obtain image information and/or spectral information of a captured object through a special chip structure.

In order to achieve the above advantage, the present application provides a spectral chip, comprising:
an image sensing layer comprising a plurality of sensing units; and
a light modulation layer located on a photosensitive path of the image sensing layer, the light modulation layer comprising at least one modulation unit and at least one non-modulation unit spaced apart from the at least one modulation unit, wherein each modulation unit corresponds to at least one sensing unit along the photosensitive path, and each non-modulating unit corresponds to at least one sensing unit along the photosensitive path;
wherein the modulation unit of the light modulation layer is configured to modulate imaging light entering the sensing unit corresponding thereto, and the sensing unit corresponding thereto is adapted to obtain frequency spectrum information of the imaging light; and wherein the non-modulation unit of the light modulation layer is configured to not modulate the imaging light entering the sensing unit corresponding thereto, and the sensing unit corresponding thereto is adapted to obtain light intensity information of the imaging light.

In the spectral imaging chip according to the present application, the at least one modulation unit and the at least one non-modulation unit are located on the same plane.

In the spectral imaging chip according to the present application, a ratio of the area of the modulation unit of the light modulation layer to the area of an effective region of the light modulation layer is greater than 0 and less than or equal to 25%, and wherein the effective region of the light modulation layer is a region set by the modulation unit and the non-modulation unit of the light modulation layer.

In the spectral imaging chip according to the present application, the ratio of the area of the modulation unit of the light modulation layer to the area of the effective region of the light modulation layer is greater than or equal to 5% and less than or equal to 15%.

In the spectral imaging chip according to the present application, a ratio of the area of the modulation unit of the light modulation layer to the area of an effective region of the light modulation layer is greater than 25% and less than or equal to 45%, and wherein the effective region of the light modulation layer is a region set by the modulation unit and the non-modulation unit of the light modulation layer.

In the spectral imaging chip according to the present application, the ratio of the area of the modulation unit of the light modulation layer to the area of the effective region of the light modulation layer is greater or equal to 25% and less than or equal to 35%.

In the spectral imaging chip according to the present application, a ratio of the area of the modulation unit of the light modulation layer to the area of an to effective region of the light modulation layer is greater than 45% and less than or equal to 60%, and wherein the effective region of the light modulation layer is a region set by the modulation unit and the non-modulation unit of the light modulation layer.

In the spectral imaging chip according to the present application, the ratio of the area of the modulation unit of the light modulation layer to the area of the effective region of the light modulation layer is greater than or equal to 50% and less than or equal to 55%.

In the spectral imaging chip according to the present application, a ratio of the area of the modulation unit of the light modulation layer to the area of an effective region of the light modulation layer is greater than 60%, and wherein the effective region of the light modulation layer is a region set by the modulation unit and the non-modulation unit of the light modulation layer.

In the spectral imaging chip according to the present application, the ratio of the area of the modulation unit of the light modulation layer to the area of the effective region of the light modulation layer is greater than or equal to 80% and less than or equal to 95%.

In the spectral imaging chip according to the present application, the non-modulation unit of the light modulation layer is located in an edge region of the light modulation layer.

In the spectral imaging chip according to the present application, the non-modulation units of the light modulation layer are arranged symmetrically with respect to a center of the light modulation layer.

In the spectral imaging chip according to the present application, the to modulation unit of the light modulation layer is located in a middle region of the light modulation layer.

In the spectral imaging chip according to the present application, the non-modulation unit of the light modulation layer is located in an edge region of the light modulation layer.

In the spectral imaging chip according to the present application, the spectral imaging chip further comprises a filter layer formed at the non-modulation unit of the light modulation layer.

In the spectral imaging chip according to the present application, the spectral imaging chip further comprises a filter layer formed at the non-modulation unit of the light modulation layer.

In the spectral imaging chip according to the present application, a degree of sparsity of the light modulation layer is greater than 0 and less than or equal to 0.5.

In the spectral imaging chip according to the present application, the degree of sparsity of the light modulation layer is greater than 0 and less than or equal to 0.15.

In the spectral imaging chip according to the present application, the degree of sparsity of the light modulation layer is greater than or equal to 0.5 and less than 1.

In the spectral imaging chip according to the present application, the degree of sparsity of the light modulation layer is greater than or equal to 0.85 and less than 1.

In the spectral imaging chip according to the present application, the spectral imaging chip further comprises: a signal processing circuit layer electrically connected to the image sensing layer.

In the spectral imaging chip according to the present application, the spectral imaging chip further comprises: a micro lens layer formed on the filter layer and/or the modulation unit of the light modulation layer.

In the spectral imaging chip according to the present application, the spectral imaging chip further comprises: a light-transmissive medium layer integrally formed on the image sensing layer, wherein an upper surface of the light-transmissive medium layer is a flat surface.

In the spectral imaging chip according to the present application, the light modulation layer is integrally combined with the light-transmissive medium layer.

In the spectral imaging chip according to the present application, a difference in refractive index between the light modulation layer and the light-transmissive medium layer is greater than or equal to 0.5.

In the spectral imaging chip according to the present application, the light modulation layer is integrally combined with the light-transmissive medium layer through a combining layer, and the light-transmissive medium layer is bonded to the combining layer.

In the spectral imaging chip according to the present application, the light-transmissive medium layer and the combining layer are made of the same material.

In the spectral imaging chip according to the present application, each modulation unit comprises a plurality of modulation subunits disposed along the photosensitive path.

In the spectral imaging chip according to the present application, each of the modulation subunits has a hole-like structure or a columnar structure.

In the spectral imaging chip according to the present application, hole cross-sectional shapes of different modulation subunits with the hole-like structure in each modulation unit are not completely the same; and/or, structural parameters of different modulation subunits with the hole-like structure in each modulation unit are not completely the same.

According to another aspect of the present application, there is further provided an information processing method suitable for a spectral imaging chip, comprising:

obtaining frequency spectrum information from a pixel point corresponding to each modulation unit in a modulation layer of the spectral imaging chip and light intensity information of a pixel point corresponding to each non-modulation unit in the modulation layer; and determining spectral information of a captured object based on the frequency spectrum information of the pixel point corresponding to each modulation unit, and determining image information of the captured object based on the light intensity information of the pixel point corresponding to each non-modulation unit.

In the information processing method suitable for the spectral imaging chip according to the present application, the modulation unit of the light modulation layer is configured to modulate imaging light entering the pixel point corresponding thereto, and the pixel point corresponding thereto is adapted to obtain frequency spectrum information of the imaging light; and wherein the non-modulation unit of to the light modulation layer is configured to not modulate the imaging light entering the pixel point corresponding thereto, and the pixel point corresponding thereto is adapted to obtain light intensity information of the imaging light.

In the information processing method suitable for the spectral imaging chip according to the present application, the modulation unit of the light modulation layer is located in a middle region of the light modulation layer.

In the information processing method suitable for the spectral imaging chip according to the present application, the non-modulation unit of the light modulation layer is located in an edge region of the light modulation layer.

In the information processing method suitable for the spectral imaging chip according to the present application, said determining the image information of the captured object based on the light intensity information of the pixel point corresponding to each non-modulation unit comprises: determining fitted light intensity information of the pixel point corresponding to each modulation unit based on light intensity information of pixel points corresponding to at least one non-modulation unit around each modulation unit; and determining the image information of the captured object based on the fitted light intensity information of the pixel point corresponding to each modulation unit and the light intensity information of the pixel point corresponding to each non-modulation unit.

In the information processing method suitable for the spectral imaging chip according to the present application, said determining the fitted light intensity information of the pixel point corresponding to each modulation unit based on the light intensity information of pixel points corresponding to the at least one non-modulation unit around each modulation unit comprises: filtering the light intensity information of the pixel points corresponding to at least one non-modulation unit around any one of the modulation units based on a smoothing to filtering method, so as to obtain fitted light intensity information of the pixel point corresponding to any one of the modulation units.

In the information processing method suitable for the spectral imaging chip according to the present application, said determining the image information of the captured object based on the fitted light intensity information of the pixel point corresponding to each modulation unit and the light intensity information of the pixel point corresponding to each non-modulation unit comprises: inputting an initial image obtained based on the light intensity information of the pixel points corresponding to all of the non-modulation units into a fitting model to obtain image information of the captured object output by the fitting model; wherein the fitting model is constructed based on an adversarial neural network, and the fitting model is obtained by training based on a missing sample image with blank pixels and a complete sample image label without blank pixels corresponding to the missing sample image.

In the information processing method suitable for the spectral imaging chip according to the present application, a training process of the fitting model comprises: training a generator in the adversarial neural network based on the missing sample image and the complete sample image label corresponding to the missing sample image, and performing competitive discrimination on the trained generator based on a discriminator in the adversarial neural network; and using the generator obtained by training as the fitting model.

Another advantage of the present application is to provide a spectral imaging apparatus, comprising a spectral imaging chip and a signal processing circuit module, wherein the spectral imaging chip and the signal processing circuit module are two independent parts, or the signal processing circuit module is integrated in the spectral imaging chip; the spectral imaging chip comprises: a light modulation layer and an image sensing layer stacked in sequence along a thickness direction; the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction; and the signal processing circuit module is electrically connected to the sensing unit.

In the spectral imaging apparatus according to the present disclosure, each modulation unit in the light modulation layer comprises a plurality of modulation subunits, and each modulation subunit is a hole-like structure or a columnar structure.

In the spectral imaging apparatus according to the present disclosure, hole cross-sectional shapes of different modulation subunits with the hole-like structure in each modulation unit are not completely the same; and/or, structural parameters of different modulation subunits with the hole-like structure in each modulation unit are not completely the same.

In the spectral imaging apparatus according to the present disclosure, different modulation subunits with the columnar structure in each modulation unit have the same structural shape and column height, and an arrangement of all modulation subunits in each modulation unit has C4 symmetry.

In the spectral imaging apparatus according to the present disclosure, the modulation subunit of the columnar structure is integrally molded or formed by stacking multiple modulation columns.

Another advantage of the present disclosure is to provide a fingerprint living body identification device for determining whether an object to be detected is a user's own living fingerprint.

In order to achieve the above advantage, the present application provides a fingerprint living body identification device, comprising a display screen, a light source module, a spectral imaging chip, a signal processing circuit module, and an identification module, wherein a fingerprint detection region is provided on the display screen; the light source module is used for irradiating an object to be detected in the fingerprint detection region, and a target light beam obtained after being reflected by the object to be detected is incident onto the spectral imaging chip; the spectral imaging chip and the signal processing circuit module are two independent parts, or the signal processing circuit module is integrated in the spectral imaging chip; the spectral imaging chip is used for determining frequency spectrum information of a pixel point corresponding to each modulation unit in the light modulation layer of the spectral imaging chip after irradiated by the target light beam and light intensity information of a pixel point corresponding to each non-modulation unit in the light modulation layer; the signal processing circuit module is used for determining spectral information of the object to be detected based on the frequency spectrum information, and determining image information of the object to be detected based on the light intensity information; and the identification module is used for identifying whether the object to be detected is a living fingerprint of a target user based on the spectral information and image information of the object to be detected.

In the fingerprint living body identification device according to an embodiment of the present disclosure, the spectral imaging chip comprises: a light modulation layer and an image sensing layer stacked in sequence along a thickness direction; the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction; and the signal processing circuit module is electrically connected to the sensing unit.

In the fingerprint living body identification device according to an embodiment of the present disclosure, the signal processing circuit module is specifically used for: determining fitted light intensity information of the pixel point corresponding to each modulation unit based on light intensity information of pixel points corresponding to a plurality of non-modulation unit around each modulation unit after irradiated by the target light beam; and determining the image information of the object to be detected based on the fitted light intensity information of the pixel point corresponding to each modulation unit, and the light intensity information of the pixel point corresponding to each non-modulation unit.

In the fingerprint living body identification device according to an embodiment of the present disclosure, the signal processing circuit module is specifically used for: filtering the light intensity information of the pixel points corresponding to at least one non-modulation unit around any one of modulation units based on a smoothing filtering method, so as to obtain fitted light intensity information of the pixel point corresponding to any one of the modulation units.

In the fingerprint living body identification device according to an embodiment of the present disclosure, the signal processing circuit module is further specifically used for:

inputting an initial image obtained by the spectral imaging chip from the pixel points corresponding to all of the non-modulation units after irradiated by the target light beam into a fitting model to obtain image information of the object to be detected output by the fitting model; and the fitting model is constructed based on an adversarial neural network, and the fitting model is obtained by training based on a missing sample image with blank pixels and a complete sample image without blank pixels corresponding to the to missing sample image.

In the fingerprint living body identification device according to an embodiment of the present disclosure, each modulation unit in the light modulation layer comprises a plurality of modulation subunits, and each modulation subunit is a hole-like structure or a columnar structure.

In the fingerprint living body identification device according to an embodiment of the present disclosure, hole cross-sectional shapes of different modulation subunits with the hole-like structure in each modulation unit are not completely the same; and/or, structural parameters of different modulation subunits with the hole-like structure in each modulation unit are not completely the same.

In the fingerprint living body identification device according to an embodiment of the present disclosure, different modulation subunits with the columnar structure in each modulation unit have the same structural shape and column height, and an arrangement of all modulation subunits in each modulation unit has C4 symmetry.

In the fingerprint living body identification device according to an embodiment of the present disclosure, the modulation subunit of the columnar structure is integrally molded or formed by stacking multiple modulation columns.

In the fingerprint living body identification device according to an embodiment of the present disclosure, the fingerprint living body identification device further comprises a lens group; the light source module is disposed between the display screen and the spectral imaging chip, and the lens group is disposed between the light source module and the spectral imaging chip; or, the light source module is disposed below a non-fingerprint detection region of the display screen, and the lens group and the spectral imaging chip are disposed in sequence below the fingerprint detection region; and the lens group is used for collimating the target light beam onto the spectral imaging chip, so that the target light beam forms an image on the spectral imaging chip.

The present disclosure further provides a fingerprint module, comprising a spectral imaging chip and a circuit board, the spectral imaging chip being electrically connected to the circuit board;
wherein a light modulation layer, an image sensing layer and a signal processing circuit module are stacked in sequence along a thickness direction of the spectral imaging chip; and wherein the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction.

In the fingerprint module according to an embodiment of the present disclosure, the fingerprint module further comprises a reinforcing plate, and the reinforcing plate is attached to the circuit board.

In the fingerprint module according to an embodiment of the present disclosure, the fingerprint module further comprises a packaging portion, and the packaging portion is molded on an upper surface of the circuit board.

In the fingerprint module according to an embodiment of the present disclosure, the fingerprint module further comprises a light-shielding portion, and the light-shielding portion is disposed on an upper surface of the packaging portion.

Further objectives and advantages of the present application will be fully embodied through the understanding of the following description and the drawings.

BRIEF DESCRIPTION OF THE DRAWINGS

The above and other objectives, features, and advantages of the present application will become more apparent from the detailed description of the embodiments of the present application taken in conjunction with the drawings. The drawings, which are used to provide a further understanding of the embodiments of the present application and constitute a part of the description, are used to explain the present application together with the embodiments of the present application, and do not constitute a limitation of the present application. In the drawings, the same reference numerals generally represent the same components or steps.

DETAILED DESCRIPTION

Figure 1:
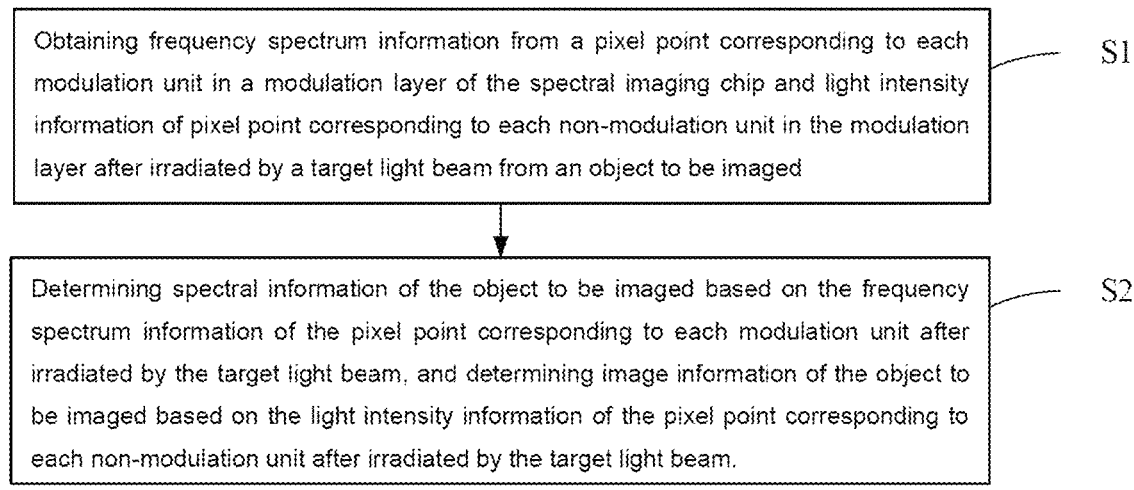
FIG. 1 illustrates a schematic flow chart of an information processing method provided by the present application.

Hereinafter, exemplary embodiments according to the present application will be described in detail with reference to the drawings. Obviously, the described embodiments are only a part of the embodiments of the present application, rather than all the embodiments of the present application. It should be understood that the present application is not limited by the exemplary embodiments described herein.

Application Overview

As described previously, the CMOS or CCD imaging chips and imaging apparatuses in the prior art cannot obtain the spectral information of the object, so that the obtained image cannot be widely used in the scenes such as intelligent AI recognition and qualitative and quantitative analysis of substance components that require the spectral information of the object as data support.

It should be known by those of ordinary skill in the art that the interaction between light and substances, such as absorption, scattering, fluorescence, Raman and the like, will produce a specific spectrum, and the spectrum of each substance is unique. In a current solution, spectral information of a captured object needs to be collected by a special apparatus (for example, a spectrometer). Therefore, when it needs to obtain the spectral information and image information of the captured object at the same time, a plurality of camera modules and/or apparatuses are often required to work in cooperation with each other, and the obtained image information and spectral information are integrated through algorithms.

It should be understood that the cost will increase due to the need for multiple camera modules and/or apparatus. More importantly, this solution occupies a relatively large space, resulting in poor mobility and poor integration of this solution. That is, it is difficult to be integrated and applied to terminal apparatuses.

Based on this, the inventor of the present application has proposed a spectral imaging chip through research on traditional photosensitive chips and spectral information measurement technology, which can obtain image information and/or spectral information of the captured object through a special chip structure. In contrast to traditional CMOS imaging chips or CCD imaging chips, the spectral imaging chip can obtain not only the spectral information of the captured object but also the image information of the captured object, so that the two kinds of information can be effectively integrated.

Further, compared with the traditional imaging chips, the spectral imaging chip according to the present application can obtain the spectral information of the captured object on the premise that the resolution of the image information of the captured object is not or little affected. Through appropriate adjustments, the spectral imaging chip according to the present application can obtain at least part of the image information of the captured object on the premise that the spectral information of the captured object is not or little affected.

It should be understood that since the spectral information of the captured object can uniquely identify the captured object, the captured object can be qualitatively or quantitatively analyzed based on the spectral information of the captured object. For example, the spectral imaging chip of the present application can be applied in the application fields such as fruit freshness analysis, air pollution degree analysis, and AI scene identification. That is, compared with the traditional CMOS imaging chips or CCD imaging chips, the spectral imaging chip according to the present application has wider application scenes.

On this basis, the present application provides a spectral imaging chip, comprising: an image sensing layer comprising a plurality of sensing units; and a light modulation layer located on a photosensitive path of the image sensing layer, the light modulation layer comprising at least one modulation unit and at least one non-modulation unit spaced apart from the at least one modulation unit, wherein each modulation unit corresponds to at least one sensing unit along the photosensitive path, and each non-modulating unit corresponds to at least one sensing unit along the photosensitive path; wherein the modulation unit of the light modulation layer is configured to modulate imaging light entering the sensing unit corresponding thereto, and the sensing unit corresponding thereto is adapted to obtain frequency spectrum information of the imaging light; and wherein the non-modulation unit of the light modulation layer is configured to not modulate the imaging light entering the sensing unit corresponding thereto, and the sensing unit corresponding thereto is adapted to obtain light intensity information of the imaging light. The sensing unit may be one physical pixel or a plurality of physical pixels of the imaging chip. Further, taking one modulation unit corresponding to one physical pixel as an example, the modulation unit may be arranged on a surface of the imaging chip at a certain period. For example, there are two non-modulation units between adjacent modulation units. It may also be understood as there are two physical pixels corresponding to the non-modulation units between adjacent modulation units.

On this basis, the present application further provides an information processing method suitable for a spectral imaging chip, comprising: obtaining frequency spectrum information from a pixel point corresponding to each modulation unit in a modulation layer of the spectral imaging chip and light intensity information of a pixel point corresponding to each non-modulation unit in the modulation layer; and determining spectral information of a captured object based on the frequency spectrum information of the pixel point corresponding to each modulation unit, and determining image information of the captured object based on the light intensity information of the pixel point corresponding to each non-modulation unit.

A modulation part mainly comprises a modulation unit to modulate incident light. The modulation part can be understood as having a broadband transmission spectrum to modulate the incident light, which is received by the sensing unit. That is, the modulation unit has a corresponding transmission spectrum curve to modulate the incident light. A non-modulated part mainly performs an adjustment function such as filtering, turning, converging, refraction, diffraction, diffusion, and/or collimation of the incident light in different embodiments, and it can be implemented with a structure with a specific adjustment function such as a filter, a concave lens, a convex lens, and a diffractive optical element. For example, the non-modulation unit is a filter unit to implement a filter function. The filter unit may be a filter unit such as R, G, B, W, Y or the like. For example, the filter unit may constitute an RGGB, RYYB, or RGBW Bayer filter, or may also be a single filter unit or an irregular Bayer filter composed of a plurality of filter units. The non-modulation unit may also be without any structure applied, so that the incident light can be directly received by the sensor unit in the whole wavelength range (without considering the filter).

On this basis, the present application further provides a spectral imaging apparatus, comprising a spectral imaging chip and a signal processing circuit module, wherein the spectral imaging chip and the signal processing circuit module are two independent parts, or the signal processing circuit module is integrated in the spectral imaging chip; the spectral imaging chip comprises: a light modulation layer and an image sensing layer stacked in sequence along a thickness direction;

the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction; and the signal processing circuit module is electrically connected to the sensing unit.

On this basis, the present application further provides a fingerprint living body identification device, comprising a display screen, a light source module, a spectral imaging chip, a signal processing circuit module, and an identification module, wherein a fingerprint detection region is provided on the display screen; the light source module is used for irradiating an object to be detected in the fingerprint detection region, and a target light beam obtained after being reflected by the object to be detected is incident onto the spectral imaging chip; the spectral imaging chip and the signal processing circuit module are two independent parts, or the signal processing circuit module is integrated in the spectral imaging chip; the spectral imaging chip is used for determining frequency spectrum information of a pixel point corresponding to each modulation unit in the light modulation layer of the spectral imaging chip and light intensity information of a pixel point corresponding to each non-modulation unit in the light modulation layer after irradiated by the target light beam; the signal processing circuit module is used for determining spectral information of the object to be detected based on the frequency spectrum information, and determining image information of the object to be detected based on the light intensity information; and the identification module is used for identifying whether the object to be detected is a living fingerprint of a target user based on the spectral information and image information of the object to be detected.

On this basis, the present application further provides a fingerprint module, comprising a spectral imaging chip and a circuit board, the spectral imaging chip being electrically connected to the circuit board, wherein a light modulation layer, an image sensing layer and a signal processing circuit module are stacked in sequence along a thickness direction of the spectral imaging chip; and wherein the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction.

After introducing the basic principles of the present application, various non-limiting embodiments of the functions of the present application will be specifically introduced below with reference to the drawings.

Exemplary Spectral Imaging Chip and Information Processing Method Suitable for the Spectral Imaging Chip Cameras are widely used in various industries. However, in the existing cameras, the image sensor can only obtain the image information of the captured object, for example, the RGB color information of the captured object, but cannot obtain the spectral information of the captured object (in other words, most of the spectral information is lost). Therefore, the present application provides an information processing method suitable for a spectral imaging chip, and the spectral imaging chip to which the information processing method is applied is used in the camera, so that the camera can obtain the spectral information of the object to at the same time when imaging, and can provide help in intelligent AI identification, qualitative and quantitative analysis of substance components, and the like.

FIG. 1 is an information processing method provided in an embodiment of the application, and the information processing method is suitable for a spectral imaging chip. As shown in FIG. 1, the information processing method suitable for a spectral imaging chip comprises:

S1, obtaining frequency spectrum information from a pixel point corresponding to each modulation unit in a modulation layer of the spectral imaging chip and light intensity information of pixel point corresponding to each non-modulation unit in the modulation layer after irradiated by a target light beam from an object to be imaged; and S2, determining spectral information of the object to be imaged based on the frequency spectrum information of the pixel point corresponding to each modulation unit after irradiated by the target light beam, and determining image information of the object to be imaged based on the light intensity information of the pixel point corresponding to each non-modulation unit after irradiated by the target light beam.

Specifically, the information processing method provided in the embodiment of the present application may be applied to a spectral imaging chip, and its execution body may be a signal processing circuit layer included in the spectral imaging chip. Imaging of the object to be imaged is implemented through the signal processing circuit layer, and the image information and spectral information of the object to be imaged are obtained. The object to be imaged may be a person, a related person identification feature, a scene, or the like.

It is worth mentioning that the above method is not absolute. In individual application scenes, the above method can be understood as the spectral imaging chip only needs to obtain image information or spectral information of the object to be imaged. At this time, it may be understood as step S1 is only used to obtain the spectral information or light intensity information; while corresponding S2 only needs to determine the image information corresponding to the object to be imaged according to the information obtained by S1. For example, if the imaging apparatus is used to obtain a spectral image, then only the spectral information is obtained in step S1, and the spectral image is output in step S2.

Figure 2:
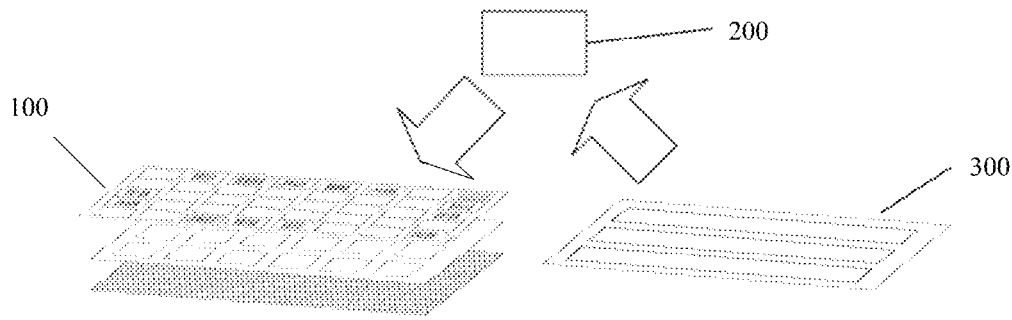
FIG. 2 illustrates a schematic structural diagram of a spectral imaging apparatus provided by the present application.

An application scene of the method may be as shown in FIG. 2. FIG. 2 is a schematic structural diagram of a spectral imaging apparatus. There is provided a spectral imaging apparatus, comprising a spectral imaging chip and a signal processing circuit module, wherein the spectral imaging chip and the signal processing circuit module are two independent parts, or the signal processing circuit module is integrated in the spectral imaging chip. When the signal processing circuit module is integrated in the spectral imaging chip as a signal processing circuit layer, the spectral imaging chip is a spectral imaging apparatus. Light emitted by a light source module 300 irradiates an object 200 to be imaged. A spectral imaging chip 100 receives a target light beam reflected by the object 200 to be imaged, and the spectral imaging chip 100 obtains image information and spectral information of the object to be imaged after processing the target light beam. The light source module 300 may be a broad spectrum light source from visible light to near infrared.

Figure 3:
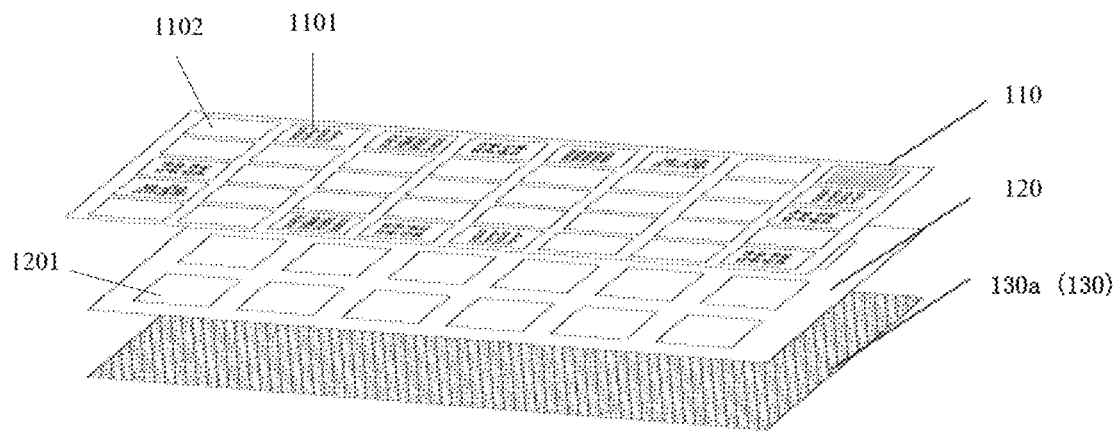
FIG. 3 illustrates a schematic diagram of a specific structure of a spectral imaging chip provided by the present application.

First, step S1 is executed. A specific structure of the spectral imaging chip may be as shown in FIG. 3. The spectral imaging chip 100 may comprise a light modulation layer 110, an image sensing layer 120 and a signal processing circuit layer 130a, and the light modulation layer 110, the image sensing layer 120 and the signal processing circuit layer 130a are stacked in sequence along a thickness direction. The light modulation layer 110 has at least one modulation unit 1101 and at least one non-modulation unit 1102 distributed along a surface, that is, the light modulation layer 110 comprises at least one modulation unit 1101 and at least one non-modulation unit 1102 distributed along its set surface. The image sensing layer 120 has a plurality of sensing units 1201 distributed along the surface. Moreover, each modulation unit 1101 and each non-modulation unit 1102 separately correspond to at least one sensing unit 1201 along the thickness direction, and each modulation unit 1101 and each non-modulation unit 1102 separately constitute a pixel point of the spectral imaging chip 100 with a corresponding sensing unit 1201. The signal processing circuit layer 130a is electrically connected to the sensing unit 1201, and the signal processing circuit layer 130a is used to execute an information processing method to determine the image information and spectral information of the object to be imaged.

Correspondingly, in step S1, the spectral information of the pixel point corresponding to each modulation unit and the light intensity information of the pixel point corresponding to each non-modulation unit indicate spectral information of a pixel point to which the modulation unit belongs and light intensity information of a pixel point to which each non-modulation unit belongs. That is, the correspondence here does not indicate a positional relationship between the non-modulation unit or the modulation unit and the pixel point, but refers to a subordination relationship between the modulation unit/the non-modulation unit and the pixel point.

The light modulation layer 110 has a thickness of 60 nm to 1200 nm, and the light modulation layer 110 may be directly prepared on the image sensing layer 120. Specifically, it is possible that one or more layers of materials are directly grown on the image sensing layer 120 and then the modulation unit is prepared by etching, or the modulation unit is directly etched and prepared on the image sensing layer 120, so as to obtain the light modulation layer 110. The image sensing layer 120 may specifically be a CIS wafer, and each sensing unit 1201 in the image sensing layer 120 corresponds to at least one physical pixel in the CIS wafer for detecting a light beam passing through the light modulation layer 110. For to example, without limitation, a micro-nano structure light modulation layer 110 may be monolithically integrated directly on the CIS wafer from the wafer level, and the preparation of the spectral imaging chip may be completed by using a CMOS process to tape out at one time.

Each modulation unit 1101 may be a micro-nano structure unit for modulating a target light beam. Each non-modulation unit 1102 has no modulation capability and cannot modulate the target light beam, but directly transmits the target light beam. Each modulation unit 1101 on the light modulation layer 110 may be directly prepared on a surface of a photosensitive region of the CIS wafer, while there are still traditional RGB or black and white pixels in the region where no modulation unit is prepared on the CIS wafer, which corresponds to the non-modulation unit on the light modulation layer. Since the light modulation layer of the spectral imaging chip comprises a modulation unit and a non-modulation unit, it can not only obtain frequency spectrum information of the pixel point corresponding to each modulation unit, i.e., frequency spectrum information detected by the corresponding sensing unit and obtained after modulated through each modulation unit, but also can obtain light intensity information of the pixel point corresponding to each non-modulation unit, i.e., light intensity information detected by the corresponding sensing unit and directly obtained through each non-modulation unit. The frequency spectrum information refers to light intensity information corresponding to light of different wavelengths at the pixel point corresponding to each modulation unit. Different modulation units may have the same or different modulation effects on light of different wavelengths, and may be set as required, which is not specifically limited in the embodiment of this aspect.

Then, step S2 is executed. According to the frequency spectrum information of the pixel point corresponding to each modulation unit after irradiated by the target light beam, the frequency spectrum information of the object to be imaged can be determined. Specifically, it can be obtained by encoding the to frequency spectrum information obtained by each modulation unit on the corresponding sensing unit of the CIS wafer, and then using a unit array response processing method to reconstruct it. Spectral reconstruction algorithms may specifically include but are not limited to least squares method, non-negative least squares method, simulated annealing method, Tikhonov regularization method, truncated singular value decomposition method, sparse optimization method and the like.

Since the frequency spectrum information of the pixel point corresponding to each modulation unit may not be used to determine the complete image information of the object to be imaged, it is necessary to determine the image information of the object to be imaged according to the light intensity information of the pixel point corresponding to each non-modulation unit after irradiated by the target light beam. A specific method may be to ignore the light intensity information of the pixel point corresponding to each modulation unit, and only use the light intensity information of the pixel points corresponding to all non-modulation units to determine the image information of the object to be imaged. It may also be to first determine the light intensity information of the pixel point corresponding to each non-modulation unit through the light intensity information of the pixel point corresponding to each modulation unit, and then combine the light intensity information of the pixel points corresponding to all non-modulation units to jointly determine the image information of the object to be imaged. This is not specifically limited in the embodiment of the present application.

The information processing method provided in the embodiment of the present application may be applied to a spectral imaging chip, wherein the spectral information of the object to be imaged is determined by obtaining the frequency spectrum information of the pixel point corresponding to each modulation unit in the modulation layer of the spectral imaging chip after irradiated by the target light beam from the object to be imaged; the image information of the to object to be imaged is determined according to the light intensity information of the pixel point corresponding to each non-modulation unit in the modulation layer after irradiated by the target light beam. Compared with the traditional image sensors, it can obtain spectral information without affecting the spatial resolution and imaging quality of the resulting image, which is convenient for grasping more comprehensive information of the object to be imaged. Moreover, since the spectral information of the object to be imaged can be used to uniquely identify the object to be imaged, qualitative or quantitative analysis of the object to be imaged can be realized by the spectral information of the object to be imaged, so that the spectral imaging chip can be applied in the fields such as fruit freshness, air pollution degree, AI scene identification and living body identification, which increases the application scenes of the spectral imaging chip, and provides a theoretical basis for the wide application of the spectral imaging chip. In addition, in the embodiment of the present application, the light modulation layer and the image sensing layer are monolithically integrated without discrete elements, which is advantageous to improve the stability of the component and reduce the size and cost of the component.

On the basis of the above-mentioned embodiment, in the information processing method provided in the embodiment of the present application, step S1, i.e., the process of determining the image information of the object to be imaged based on the light intensity information of the pixel point corresponding to each non-modulation unit after irradiated by the target light beam, comprises: firstly, determining fitted light intensity information of the pixel point corresponding to each modulation unit based on the light intensity information of the pixel points corresponding to at least one non-modulation unit around each modulation unit after irradiated by the target light beam; and then, determining the image information of the object to be imaged based on the fitted light intensity information of the pixel point corresponding to each modulation unit and the light intensity information of the pixel point corresponding to each non-modulation unit.

Figure 4:
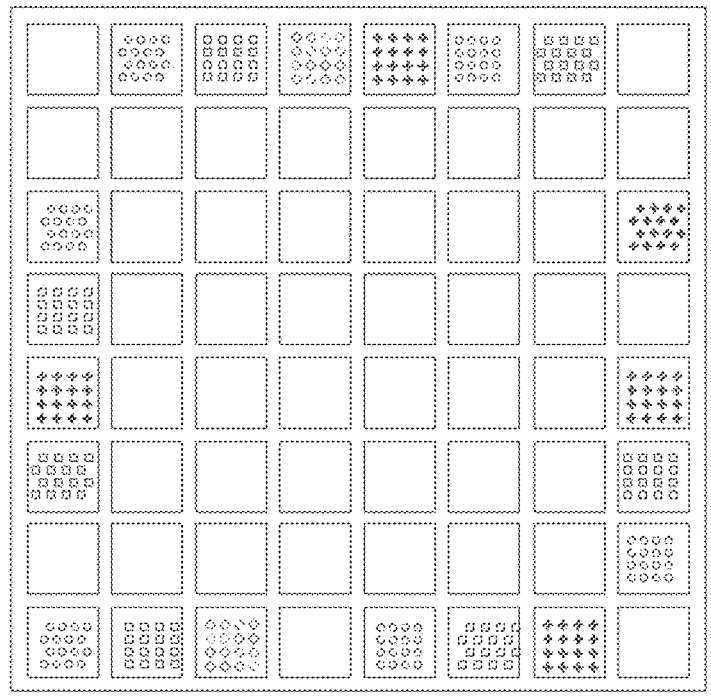
FIG. 4 illustrates a schematic structural diagram of a light modulation layer in the spectral imaging chip provided by the present application.
Figure 5:
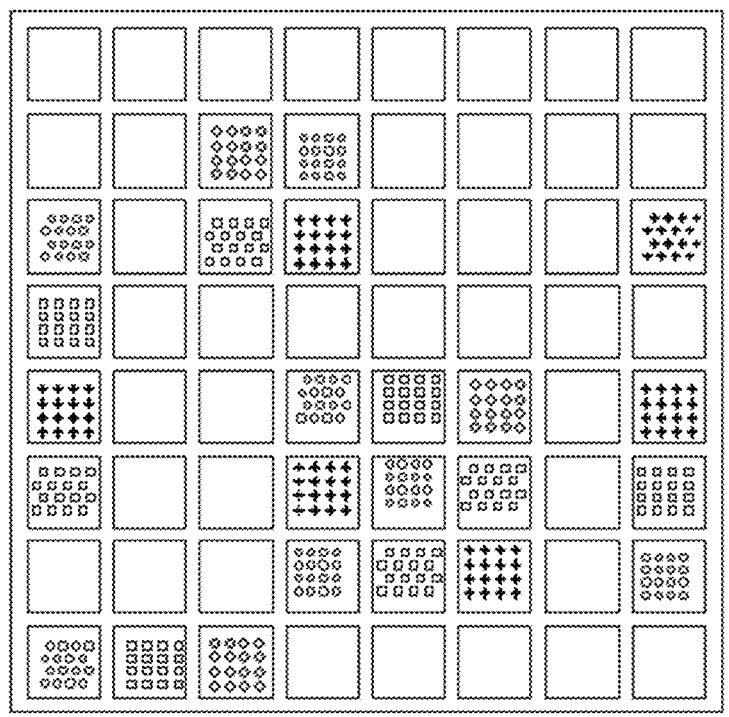
FIG. 5 illustrates a schematic structural diagram of a light modulation layer in the spectral imaging chip provided by the present application.
Figure 6:
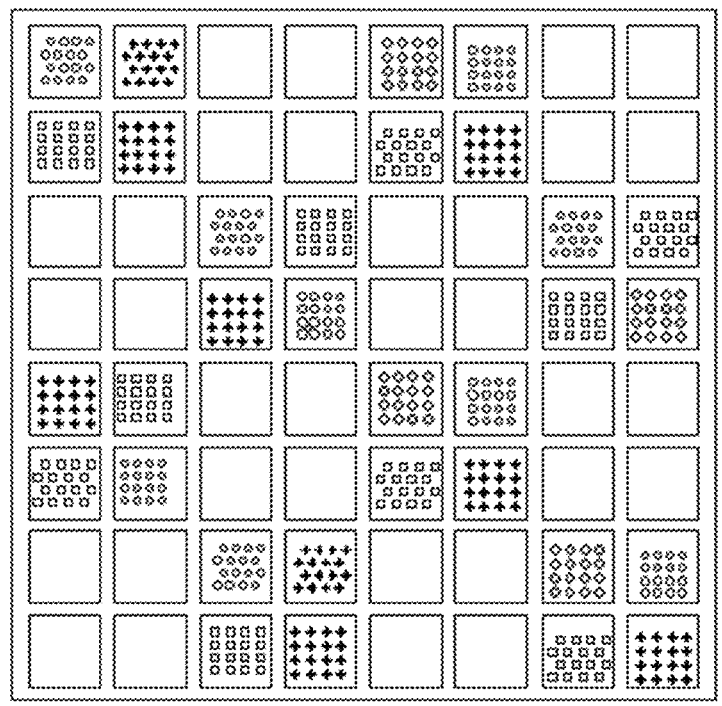
FIG. 6 illustrates a schematic structural diagram of a light modulation layer in the spectral imaging chip provided by the present application.
Figure 7:
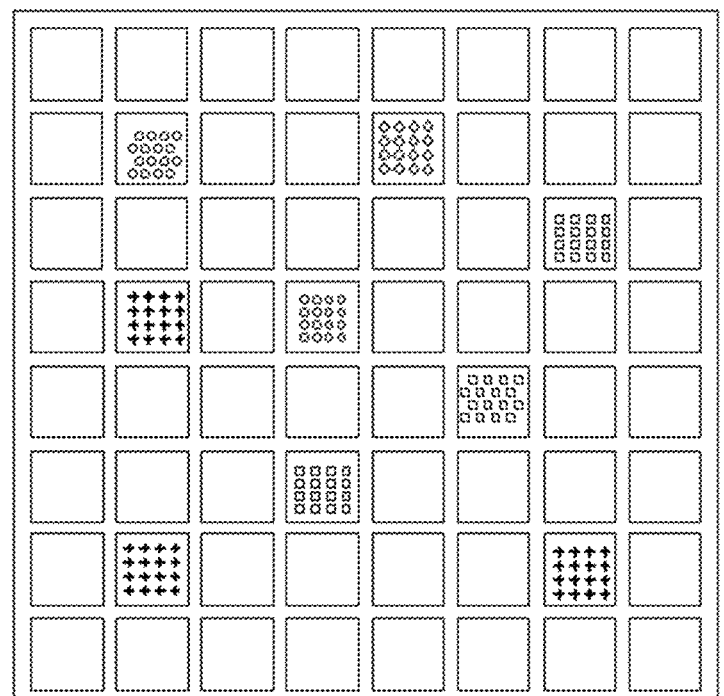
FIG. 7 illustrates a schematic structural diagram of a light modulation layer in the spectral imaging chip provided by the present application.

Specifically, in the embodiment of the present application, when the image information of the object to be imaged is determined, firstly, fitted light intensity information of the pixel point corresponding to each modulation unit may be determined according to the light intensity information of the pixel points corresponding to at least one non-modulation unit around each modulation unit after irradiated by the target light beam. "Around each modulation unit" refer to 8 positions closest to the modulation unit on the left, top left, top, top right, right, bottom right, bottom, and bottom left. The number of non-modulation units around each modulation unit is related to the structure of the light modulation layer. The light modulation layer is generally a rectangular structure. There are 3 units around each of units at the vertex positions, 5 units around each of units at edge positions other than the vertex positions, and 8 units around each of units at positions except for the vertex positions and the other edge positions. If the structure of the light modulation layer is as shown in FIG. 4, then there are at most 5 non-modulation units and at least 3 non-modulation units around each modulation unit; if the structure of the light modulation layer is as shown in FIG. 5, then there are at most 6 non-modulation units and at least 0 non-modulation units around each modulation unit; if the structure of the light modulation layer is as shown in FIG. 6, there are at most 4 non-modulation units and at least 0 non-modulation units around each modulation unit; and if the structure of the light modulation layer is as shown in FIG. 7, there are 8 non-modulation units around each modulation unit. The present application takes a rectangular structure as an example just for ease of understanding, and the specific light modulation layer structure may be designed according to requirements.

Taking the structure of the light modulation layer shown in FIG. 7 as an example, the light intensity information of the pixel points corresponding to at least one non-modulation unit around each modulation unit may be fitted so as to determine fitted light intensity information of the pixel point corresponding to each to modulation unit. The fitting method may be arithmetic average, weighted average, selection of the median of the light intensity information or the like, and is not specifically limited in the embodiment of the present application.

Then, according on the fitted light intensity information of the pixel point corresponding to each modulation unit, and the light intensity information of the pixel point corresponding to each non-modulation unit, the image information of the object to be imaged can be determined. The image information is complete image information in which the light intensity information of each pixel point is included.

In an embodiment of the present application, the fitted light intensity information of the pixel point corresponding to each modulation unit is determined through the light intensity information of the pixel points corresponding to at least one non-modulation unit around each modulation unit after irradiated by the target light beam, so that the image information of the object to be imaged can be determined as complete image information according to the fitted light intensity information of the pixel point corresponding to each modulation unit and the light intensity information of the pixel point corresponding to each non-modulation unit, ensuring the integrity of the image so as not to affect the overall imaging.

On the basis of the above-mentioned embodiment, in the information processing method provided in the embodiment of the present application, determining fitted light intensity information of the pixel point corresponding to each modulation unit based on light intensity information of pixel points corresponding to a plurality of non-modulation units around each modulation unit after irradiated by the target light beam specifically comprises:
filtering the light intensity information of the pixel points corresponding to a plurality of non-modulation units around any one modulation unit based on a smoothing filtering method, so as to obtain fitted light intensity information of the pixel point corresponding to said any one modulation unit.

Specifically, in the embodiment of the present application, when determining the fitted light intensity information of the pixel point corresponding to each modulation unit, it may be specifically implemented through a smoothing filtering method. The smoothing filtering method may include median filtering, smoothing filtering, Gaussian filtering, and the like.

For median filtering, if a size of a filter window is 3*3 pixel points, the light intensity information of the pixel point corresponding to any one modulation unit A is:

$$f(x, y) = median[f(x-1, y-1), f(x, y-1), f(x+1, y-1), f(x-1, y),$$
$$f(x+1, y), f(x-1, y+1), f(x, y+1), f(x+1, y+1)]$$

where median represents a median operation, $f(x,y)$ is the light intensity information of the pixel point corresponding to the modulation unit A, $(x,y)$ is a coordinate value of the pixel point corresponding to the modulation unit A; $f(x-1, y-1)$ is the light intensity information of the pixel point corresponding to a non-modulation unit at the bottom left of the modulation unit A, and if there is no non-modulation unit at the bottom left of the modulation unit A, then the value is 0; $f(x,y-1)$ is the light intensity information of the pixel point corresponding to the non-modulation unit at the bottom of the modulation unit A, and if there is no non-modulation unit at the bottom of the modulation unit A, and the value is 0; $f(x+1,y-1)$ is the light intensity information of the pixel point corresponding to the non-modulation unit at the bottom right of the modulation unit A, and if there is no non-modulation unit at the bottom right of the modulation unit A, then the value is 0; $f(x-1, y)$ is the light intensity information of the pixel point corresponding to the non-modulation unit on the left of the modulation unit A, and if there is no non-modulation unit on the left of the modulation unit A, then the value is 0; $f(x+1, y)$ is the light intensity information of the pixel point corresponding to the non-modulation unit on the right of the modulation unit A, and if there is no to non-modulation unit on the right of the modulation unit A, then the value is 0; $f(x-1,y+1)$ is the light intensity information of the pixel point corresponding to the non-modulation unit at the top left of the modulation unit A, and if there is no non-modulation unit at the top left of the modulation unit A, then the value is 0; $f(x,y+1)$ is the light intensity information of the pixel point corresponding to the non-modulation unit at the top of the modulation unit A, and if there is no non-modulation unit at the top of the modulation unit A, then the value is 0; and $f(x+1,y+1)$ is the light intensity information of the pixel point corresponding to the non-modulation unit at the top right of the modulation unit A, and if there is no non-modulation unit at the top right of the modulation unit A, then the value is 0.

For average filtering, if the size of the filter window is 3*3 pixel points, then the light intensity information of the pixel point corresponding to any one modulation unit A is:

$$f(x, y) = [f(x-1, y-1) + f(x, y-1) + f(x+1, y-1) + f(x-1, y) +$$
$$f(x+1, y) + f(x-1, y+1) + f(x, y+1) + f(x+1, y+1)]/8$$

For Gaussian filtering, if the size of the filtering window is 3*3 pixel points, then the light intensity information of the pixel point corresponding to any one modulation unit A is:

$$f(x, y) = 0.111 *$$
$$[f(x-1, y-1) + f(x+1, y-1) + f(x-1, y+1) + f(x+1, y+1)] +$$
$$0.139 * [f(x, y-1) + f(x-1, y) + f(x+1, y) + f(x, y+1)]$$

where 0.111 and 0.139 are weights of the light intensity information of the corresponding pixel points, respectively.

On the basis of the above-mentioned embodiment, in the information processing method provided in the embodiment of the present application, the step of determining the image information of the object to be imaged based on the light intensity information of the pixel point corresponding to each non-modulation unit after irradiated by the target light beam comprises: inputting an initial image obtained based on the light intensity information of the pixel points corresponding to all non-modulation units after irradiated by the target light beam to a fitting model to obtain the image information of the object to be imaged output by the fitting model; wherein the fitting model is constructed based on an adversarial neural network, and the fitting model is obtained by training based on a missing sample image with blank pixels and a complete sample image label without blank pixels corresponding to the missing sample image.

Specifically, in an embodiment of the present application, when determining the image information of the object to be imaged, it may be specifically implemented through a machine learning method such as an adversarial neural network. In an embodiment of the present application, a fitting model is constructed through an adversarial neural network, and the fitting model is trained through a blank sample image with blank pixels and a complete sample image label without blank pixel corresponding to the blank sample image. Finally, an initial image obtained based on the light intensity information of the pixel points corresponding to all of non-modulation units after irradiated by the target light beam is input into a fitting model to obtain image information of the captured object output by the fitting model. The complete sample image label refers to an actual complete sample image corresponding to the missing sample image.

In the embodiment of the present application, a fitting model constructed based on an adversarial neural network is introduced, so that the image information of the object to be imaged can be determined more quickly and accurately.

On the basis of the above-mentioned embodiment, in the information processing method provided in the embodiment of the present application, obtaining the fitting model by training based on the missing sample image with blank pixels and the complete sample image label without blank pixels corresponding to the missing sample image specifically comprises:

training a generator in the adversarial neural network based on the missing sample image and the complete sample image label corresponding to the missing sample image label, and performing competitive discrimination on the trained generator based on a discriminator in the adversarial neural network; and using the generator obtained by training as the fitting model.

Specifically, the adversarial neural network comprises a generator and a discriminator. The generator takes a missing sample image as an input and generates a complete sample image corresponding to the missing sample image as an output. The discriminator takes multiple complete sample images as an input, and these complete sample images comprises the complete sample image label and the complete sample image generated by the generator. During training, the generator and the discriminator compete with each other. The goal of the generator is to output a complete sample image with a high score through discrimination of the discriminator as much as possible. The goal of the discriminator is to make the complete sample image label score as high as possible, and at the same time to make the score of the complete sample image output by the generator as low as possible. After training, a generator is obtained, and the trained generator is used as a fitting model.

As shown in FIG. 3, on the basis of the above-mentioned embodiments, a spectral imaging chip is provided in an embodiment of the present application, and comprises a light modulation layer 110, an image sensing layer 120, and a signal processing circuit layer 130a stacked in sequence along a thickness direction, wherein the light modulation layer 110 has at least one modulation unit 1101 and at least one non-modulation unit 1102 distributed along a surface. The image sensing layer 120 has a plurality of sensing units 1201 distributed along a surface. Moreover, each modulation unit 1101 and each non-modulation unit 1102 separately correspond to at least one sensing unit 1201 along the thickness direction, and each modulation unit 1101 and each non-modulation unit 1102 separately constitute a pixel point of the spectral imaging chip 100 with a corresponding sensing unit 1201. The signal processing circuit layer 130a is electrically connected to the sensing unit 1201, and the signal processing circuit layer 130a is used to execute the information processing method provided in the above-mentioned embodiment to determine the image information and spectral information of the object to be imaged. The light modulation layer 110 has a thickness of 60 nm to 1200 nm, and the light modulation layer 110 may be directly prepared on the image sensing layer 120. Specifically, it is possible that one or more layers of materials are directly grown on the image sensing layer 120 and then the modulation unit is prepared by etching, or the modulation unit is directly etched on the image sensing layer 120 so as to obtain the light modulation layer 110. The image sensing layer 120 may specifically be a CIS wafer, and each sensing unit in the image sensing layer 120 corresponds to a pixel in the CIS wafer for detecting a light beam passing through the light modulation layer. A micro-nano structure light modulation layer is monolithically integrated directly on the CIS wafer from the wafer level, and the preparation of the spectral imaging chip may be completed by using a CMOS process to tape out at one time.

The spectral imaging chip provided in the embodiment of the present application can simultaneously determine the image information and spectral information of the object to be imaged, so that the spectral imaging chip can be applied in the fields such as fruit freshness, air pollution degree and AI scene identification, which increases the application scenes of the spectral imaging chip, and provides a theoretical basis for the wide application of the spectral imaging to chip. In addition, in the embodiment of the present application, the light modulation layer and the image sensing layer are monolithically integrated without discrete elements, which is advantageous to improve the stability of the component and reduce the size and cost of the component.

As a preferred solution, the light modulation layer may be silicon nitride with a thickness of 200 nm to 500 nm. There may be 1,000 to 250,000 units distributed on the light modulation layer, and each unit has a size of 100 $\mu m^2$ to 40,000 $\mu m^2$. Among them, the modulation units account for 10% of the total number of units, and the remaining 90% are non-modulation units.

As a preferred solution, the light modulation layer may be silicon with a thickness of 100 to 400 nm. There may be 1,000 to 250,000 units distributed on the light modulation layer, and each unit has a size of 100 $\mu m^2$ to 40,000 $\mu m^2$. Among them, the modulation units account for 15% of the total number of units, and the remaining 85% are non-modulation units.

On the basis of the above-mentioned embodiments, in a spectral imaging chip provided in an embodiment of the present application, the modulation unit in the light modulation layer may specifically be a micro-nano structure unit, which is obtained by etching. The structure of the light modulation layer is as shown in FIGS. 4 to 7. In FIG. 4, there are a plurality of different modulation units distributed at edge positions of the light modulation layer. Each modulation unit may correspond to one or more sensing units. The modulation units may completely occupy or not completely occupy the edge positions, may be distributed continuously or discontinuously, and may be located at any edge position. At the remaining positions of the light modulation layer, there are non-modulation units, that is, no modulation unit is etched, it is a blank unit, and the target light beam can be directly transmitted to the CIS wafer RGB or black and white pixels under the light modulation layer. There is a corresponding sensing unit below each unit (including to the modulation units and the non-modulation units) of the light modulation layer. Each modulation unit in the light modulation layer has different modulation effects on light of different wavelengths, and the modulation mode of the input spectrum can be the same or different between the modulation units. Different modulation modes can include, but are not limited to, scattering, absorption, transmission, reflection, interference, plasmon, resonance enhancement and the like. The final effect of modulation is that the light of different wavelengths has different transmission spectra after passing through the modulation unit. After the light is modulated by the modulation unit, the light intensity information is detected by a corresponding sensing unit below the modulation unit. Each unit and the sensing unit below it constitute a pixel point. The intensity distribution of wavelengths on a pixel can be obtained through an algorithm.

In FIG. 5, there are a plurality of different modulation units distributed at edge positions and middle positions of the light modulation layer. Each modulation unit may correspond to one or more sensing units. The modulation units may be located at any edge position or middle position, and may be distributed continuously or discontinuously, and the positions may be arbitrarily selected. Each modulation unit may be an array composed of a plurality of identical modulation subunits, or may be an array composed of a plurality of different modulation subunits.

In FIG. 6, every four modulation units on the light modulation layer are a group of modulation units, every four non-modulation units are a group of non-modulation units, and each group of modulation units is distributed apart from each group of non-modulation units.

In FIG. 7, the 8 positions around each modulation unit on the light modulation layer are all non-modulation units, and there are no other modulation units.

Figure 8:
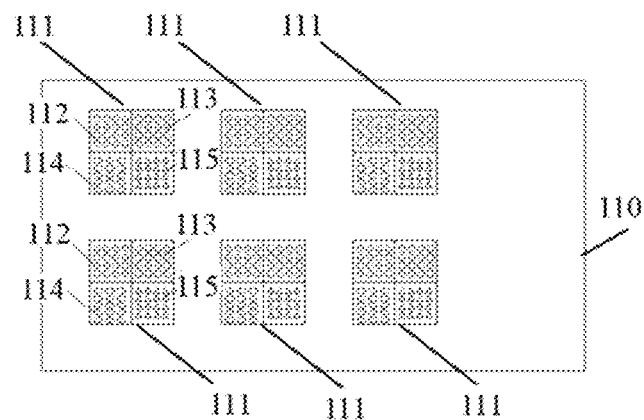
FIG. 8 illustrates a schematic structural diagram of a light modulation layer in the spectral imaging chip provided by the present disclosure.
Figure 9:
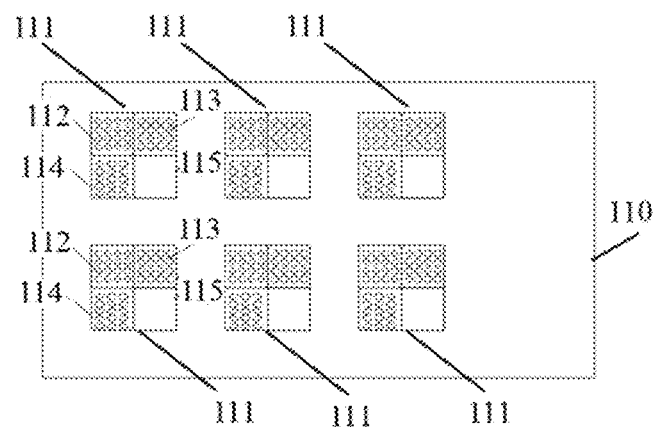
FIG. 9 illustrates a schematic structural diagram of a light modulation layer in the spectral imaging chip provided by the present disclosure.

As shown in FIGS. 8 and 9, the light modulation layer 110 has at least one group of modulation units 111 distributed along a surface of the light modulation layer 110. Each group of modulation units 111 comprises a plurality of modulation units distributed along a surface of each group of modulation units 111, and each modulation unit has C4 symmetry. C4 symmetry is manifested as the structure of the modulation unit after the modulation unit is rotated by 90°, 180° or 270° along an axis of symmetry coincides with the original structure. The optional structure of the modulation unit includes a circle, a cross, a regular polygon, a square and the like. 8 positions around each group of modulation units on the light modulation layer are all non-modulation units, and there are no other modulation units.

In some embodiments, as shown in FIGS. 8 and 9, at least a part of the modulation units in each group of modulation units 111 have a plurality of modulation holes disposed along the thickness direction, and the plurality of modulation holes are distributed along a surface of each modulation unit to form a modulation hole array. The modulation hole array means that a plurality of modulation holes on the modulation unit provided with modulation holes are arranged in rows and columns. For example, the modulation hole arrays shown in a first modulation unit 112, a second modulation unit 113, a third modulation unit 114, and a fourth modulation unit 115 are all arranged in 4 rows*4 columns. Of course, FIG. 8 is only schematic, and it does not mean that the modulation hole array in the embodiment of the present disclosure is limited to 4 rows*4 columns.

As shown in FIGS. 8 and 9, the plurality of modulation units in each group of modulation units 111 have modulation holes, and the shapes of the modulation holes of the plurality of modulation units in each modulation unit are different. Each modulation unit has different modulation effects on light of different wavelengths. The modulation modes for the input spectrum are different between the modulation units. Different modulation modes can include, but are not limited to, scattering, absorption, transmission, reflection, interference, plasmon, resonance enhancement and the like. The final effect of modulation is that the light of different wavelengths has different transmission spectra after passing through the modulation hole array of the modulation unit. After the light is modulated by the modulation hole array, the light intensity is detected by a sensing unit below the modulation hole array. Each modulation unit and the sensing unit below it constitute a pixel point. The intensity distribution of wavelengths on a pixel point can be obtained through an algorithm. Through the same modulation hole array pixels of different modulation units, an image under a certain modulation mode can be obtained, and a plurality of pixels constitute an image including multiple pieces of frequency spectrum information.

The modulation subunits located at the same position in any two groups of modulation units 111 have the same modulation hole array. For example, in the embodiment shown in FIG. 8, each group of modulation units 111 comprises a first modulation unit 112, a second modulation unit 113, a third modulation unit 114, and a fourth modulation unit 115, and the modulation hole arrays in the first modulation unit 112, the second modulation unit 113, the third modulation unit 114, and the fourth modulation unit 115 are all different. The modulation hole arrays of the first modulation units 112 in the groups of modulation units 111 are all the same, the modulation hole arrays of the second modulation units 113 in the groups of modulation units 111 are all the same, the modulation hole arrays of the third modulation unit 114 in the groups of modulation units 111 are all the same, and the modulation hole arrays of the fourth modulation unit 115 in the groups of modulation units 111 are all the same.

At least a part of the modulation units in each group of modulation units 111 have a plurality of modulation holes disposed along the thickness direction, which means that there are at least the following two implementation modes.

First, as shown in FIG. 8, one or more groups of repeated modulation units 111 are provided on the light modulation layer 110. For example, in the embodiment shown in FIG. 8, 6 groups of repeated modulation units 111 are shown. Each group of modulation units 111 is divided into a plurality of modulation units. In the embodiment shown in FIG. 8, each group of modulation units 111 comprises a first modulation unit 112, a second modulation unit 113, a third modulation unit 114, and a fourth modulation unit 115. The first modulation unit 112, the second modulation unit 113, the third modulation unit 114, and the fourth modulation unit 115 are each provided with a modulation hole array. The modulation unit has C4 symmetry. Correspondingly, the modulation hole array also has C4 symmetry. C4 symmetry is manifested as the structure in the modulation unit after the modulation unit is rotated by 90°, 180° or 270° along an axis of symmetry coincides with the original structure.

Second, as shown in FIG. 9, one or more groups of repeated modulation units 111 are provided on the light modulation layer 110. For example, in the embodiment shown in FIG. 9, 6 groups of repeated modulation units 111 are shown, and each group of modulation units 111 is divided into a plurality of modulation units. In the embodiment shown in FIG. 9, each group of modulation units 111 comprises a first modulation unit 112, a second modulation unit 113, a third modulation unit 114, and a fourth modulation unit 115. The first modulation unit 112, the second modulation unit 113, and the third modulation unit 114 are each provided with a modulation hole array. However, the fourth modulation unit 115 is engraved through the entire unit, and the incident light passes through it, which can be used for the calibration of the unit's direct light intensity. The remaining modulation hole arrays each correspond to light of a certain wavelength and have a narrow-band filtering effect. The modulation hole arrays at the same position in different groups of modulation units 111 are the same, and there is a corresponding sensing unit below each modulation hole array. After the light passes through the narrow-band filtering of the modulating hole array, the light intensity is detected by the sensing unit below the modulating hole array detects, and is differentiated from the direct incident light to obtain the light intensity of light of each wavelength after the narrow-band filtering. Each group of modulation units 111 and the sensing unit below the modulation units 111 constitute a pixel point. Through the pixels of the same modulation hole array of different groups of modulation units 111, an image at a certain wavelength can be obtained, and a plurality of pixel points form an image including multiple pieces of frequency spectrum information.

For the above two solutions, the modulation effect can be changed by changing the shape of the modulation subunit or the modulation hole array. The geometric shape of the modulation hole array may include, but is not limited to, a circle, a cross, a regular polygon, a rectangle, and any combination thereof. The modulation effect may also be changed by changing at least one structural parameter of the modulation hole array. The structural parameter may include, but is not limited to, parameters such as period, radius, side length, duty cycle and thickness of the modulation hole array, and any combination thereof. The above two solutions may be selected alone or in combination. The modulation hole array on the light modulation layer 110 may be a hole penetrating the flat plate, or may be a blind hole with a certain depth.

On the basis of the above-mentioned embodiments, in a spectral imaging chip provided in an embodiment of the present application, each modulation unit in the light modulation layer comprises a plurality of modulation subunits disposed along the thickness direction, and each modulation subunit is a hole-like structure or a columnar structure.

Specifically, in the embodiment of the present application, each modulation unit in the light modulation layer comprises a plurality of modulation subunits disposed along the thickness direction. The modulation subunit may be a hole-like structure, or may be a columnar structure. The modulation subunit with the to hole-like structure may be called a modulation hole, and the modulation subunit with the columnar structure may be called a modulation column. It needs to be noted that the same modulation unit can only include modulation holes or modulation columns, and cannot include both modulation holes and modulation columns at the same time. Therefore, the modulation unit including the modulation holes can be called a hole modulation unit, and the modulation unit including the modulation holes can be called a column modulation unit.

On the basis of the above-mentioned embodiments, in a spectral imaging chip provided in an embodiment of the present application, hole cross-sectional shapes of different modulation subunits with the hole-like structure in each modulation unit are not completely the same; and/or, structural parameters of different modulation subunits with the hole-like structure in each modulation unit are not completely the same.

Specifically, the hole cross-sectional shapes of different modulation holes in each modulation unit in the embodiment of the present application may be the same, or may be completely different or partially the same and partially different. In other words, all modulation holes in the same modulation unit have the same or different hole cross-sectional shapes. The structural parameters of the modulation holes in each modulation unit may also be the same, or may be completely different or partially the same and partially different. Whether the hole cross-sectional shapes of different modulation holes in each modulation unit are the same does not affect whether the structural parameters are the same. The hole cross-sectional shape includes a circle, an ellipse, a cross, a regular polygon, a star, or a rectangle. The structural parameter may include, but is not limited to, parameters such as period, radius, side length, duty cycle, thickness, length of major axis, length of minor axis, rotation angle, or number of angles of the modulation hole in each modulation unit. The modulation holes can be arranged row-by-row or column-by-column in accordance with a preset period order, or arranged in an array in accordance with a gradual order of the magnitude of the structural parameter.

Since the different hole cross-sectional shapes and/or different structural parameters of the modulation holes in the modulation unit will each affect its modulation effect, the modulation effect may be changed by changing the shape of the modulation holes in the modulation unit. The change of the structural parameters can be the change of the structural parameters in any combination of the above.

The period of the modulation hole in each column modulation unit may have a value between 50 nm and 800 nm, and the duty cycle may have a value between 5% and 95%. The period of the modulation hole may also have a value between 80 nm and 600 nm, and the duty cycle may also have a value between 10% and 90%.

Different modulation units have different modulation effects on the spectrum, and the spectrum modulation effects may include, but are not limited to, scattering, absorption, transmission, reflection, interference, surface plasmon, resonance, and the like. The modulation effect may be changed by changing the structural parameters (including but not limited to one of parameters such as period, radius, side length, duty cycle and thickness, or any combination of the parameters) and arrangement mode of the modulation holes in the column modulation unit, and the sensitivity to the difference between different spectra may be improved by increasing the number of modulation columns.

On the basis of the above-mentioned embodiment, in a spectral imaging chip provided in an embodiment of the present application, different modulation subunits with the columnar structure in each modulation unit have the same structural shape and column height, and an arrangement of all modulation subunits in each modulation unit has C4 symmetry.

Specifically, each column modulation unit includes several modulation columns, all modulation columns in the same column modulation unit have the same structural shape, and the modulation columns are arranged row by row or column by column in accordance with a preset period order, and have C4 symmetry.

Figure 10:
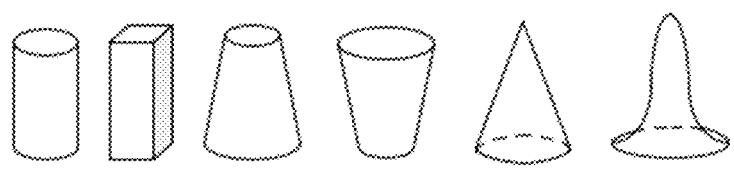
FIG. 10 illustrates a schematic diagram of a structure and shape of a modulation column in the spectral imaging chip provided by the present application.
Figure 11:
FIG. 11 illustrates a schematic diagram of a longitudinal-sectional shape of the modulation column in the spectral imaging chip provided by the present application.

All the modulation columns in the same column modulation unit have the same height, and the modulation column heights of different column modulation units may be the same or different. The structural parameters of the modulation column may include height, longitudinal-section structural parameters, cross-sectional structural parameters, and the like. The structural shape of the modulation column may be as shown in FIG. 10, including but not limited to a cylinder, a cube, a truncated cone, a cone, a bell, and the like. The longitudinal-sectional shape of the modulation column may be as shown in FIG. 11, including but not limited to a rectangle, a trapezoid, a triangle, a bell and the like. The cross-sectional shape of the modulation column includes a rectangle, a circle, and the like.

The height of the modulation column may have a value between 100 nm and 400 nm. For a cylindrical modulation column, the diameter of the modulation column may have a value between 10 nm and 300 nm. For a cubic modulation column, the section of the modulation column may be square or rectangular, and the side length may have a value between 10 nm and 400 nm. For the truncated cone-shaped modulation column, the diameter of the two circular sections of the modulation column may have a value between 10 nm and 400 nm. For the conical modulation column, the diameter of the bottom surface circle of the modulation column may have a value between 10 nm and 400 nm. For the bell-shaped modulation column, the diameter of the bottom surface circle of the modulation column may have a value between 10 nm and 400 nm.

On the basis of the above-mentioned embodiments, in a spectral imaging to chip provided in an embodiment of the present application, the modulation subunits of the columnar structure are integrally molded and/or formed by stacking.

Figure 12:
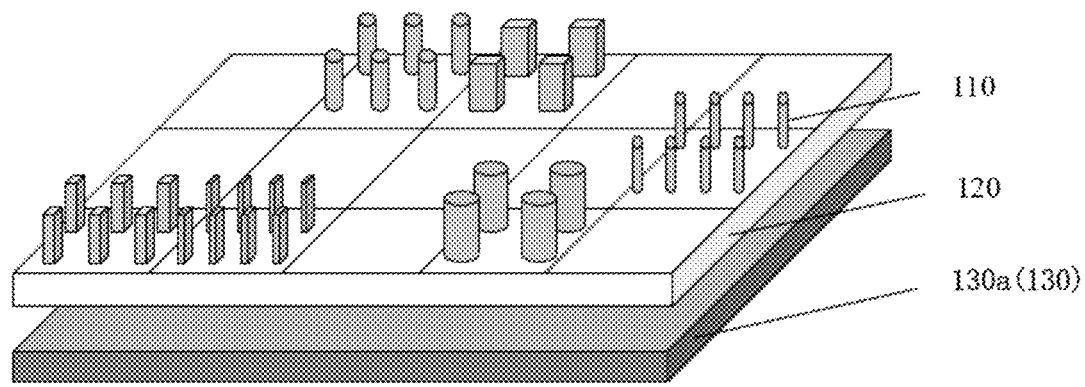
FIG. 12 illustrates a schematic structural diagram of a spectral imaging chip provided by the present application.
Figure 13:
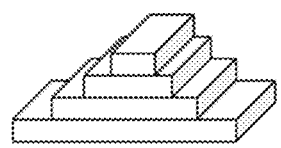
FIG. 13 illustrates a schematic structural diagram of a spectral imaging chip provided by the present application.

Specifically, as shown in FIG. 12, the spectral imaging chip comprises a light modulation layer 110, an image sensing layer 120, and a signal processing circuit layer 130a. The modulation unit of the light modulation layer 110 includes modulation columns, and the modulation columns are integrally molded. As shown in FIG. 13, the modulation column may also be formed by stacking multiple layers of sub-modulation columns. Each layer of sub-modulation columns may have the same or different structures and shapes. The sub-modulation columns of each layer may be cubes, cylinders or the like. Each layer of sub-modulation columns may have the same or different materials, which may be any one of metal or medium. In FIG. 13, the modulation column is formed by stacking multiple layers of rectangular parallelepipeds.

The same column modulation unit may include only the modulation columns obtained by integral molding, or may only include the modulation columns formed by stacking, or may also include different modulation columns formed by integral molding and stacking at the same time.

On the basis of the above-mentioned embodiments, the modulation units include, but are not limited to, one-dimensional photonic crystals, two-dimensional photonic crystals, surface plasmons, metamaterials, metasurfaces, and the like. Specific materials may include silicon, germanium, silicon germanium materials, silicon compounds, germanium compounds, metals, III-V group materials and the like, wherein the silicon compounds include, but are not limited to, silicon nitride, silicon dioxide, silicon carbide, and the like.

On the basis of the above-mentioned embodiment, in a longitudinal direction, the light modulation layer may include at least one sub-modulation layer to disposed along the thickness direction. The material of each sub-modulation layer may be the same or different to increase the ability of the light modulation layer to modulate the target light beam on the frequency spectrum, making the ability to sample the target light beam stronger, which is advantageous to improve the accuracy of spectrum recovery. The light modulation layer may have the following four situations in the longitudinal direction.

Figure 14:
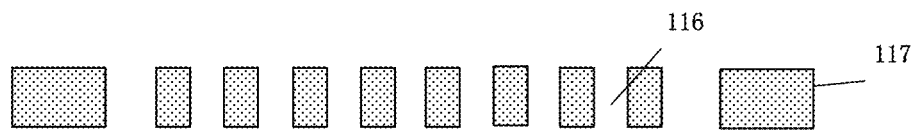
FIG. 14 illustrates a schematic structural diagram of a light modulation layer in the spectral imaging chip provided by the present application.
Figure 15:
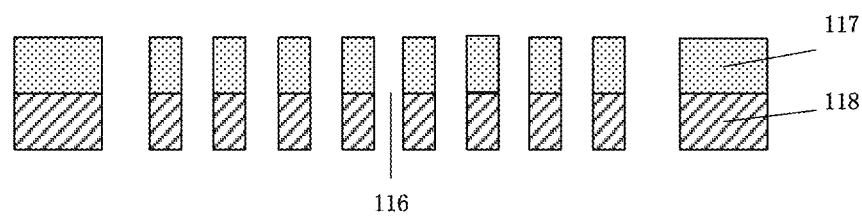
FIG. 15 illustrates a schematic structural diagram of a light modulation layer in the spectral imaging chip provided by the present application.
Figure 16:
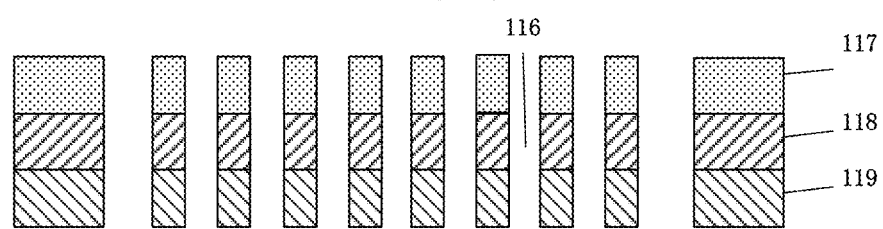
FIG. 16 illustrates a schematic structural diagram of a light modulation layer to in the spectral imaging chip provided by the present application.
Figure 17:
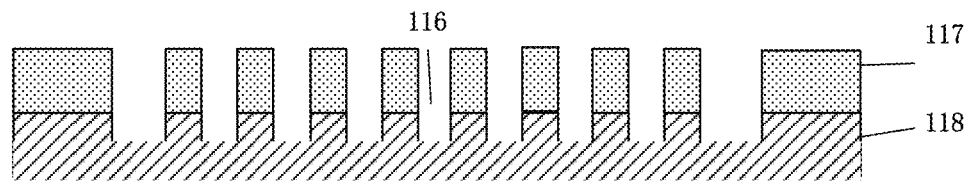
FIG. 17 illustrates a schematic structural diagram of a light modulation layer in the spectral imaging chip provided by the present application.
Figure 18:
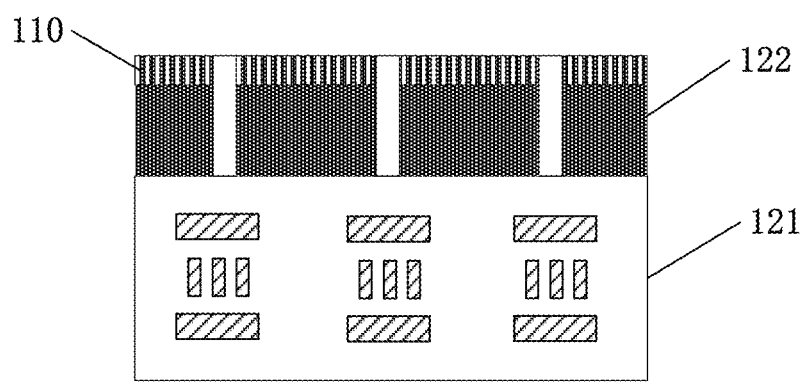
FIG. 18 illustrates a schematic structural diagram of a light modulation layer in the spectral imaging chip provided by the present application.

1) As shown in FIG. 14, the polarization-independent light modulation layer is a single material layer, comprising a first sub-modulation layer 117, and the thickness of the light modulation layer is 60 nm to 1200 nm.
2) As shown in FIGS. 15 and 16, the polarization-independent light modulation layer 110 may comprise multiple sub-modulation layers, and the sub-modulation layers have different materials. The sub-modulation layers have a thickness of 60 nm to 1200 nm. The materials of the sub-modulation layers may include silicon, germanium, silicon germanium materials, silicon compounds, germanium compounds, metals, III-V materials and the like, wherein the silicon compounds include, but are not limited to, silicon nitride, silicon dioxide, carbide silicon and the like. For example, in the embodiment shown in FIG. 15, the light modulation layer comprises a first sub-modulation layer 117 and a second sub-modulation layer 118. For example, in the embodiment shown in FIG. 16, the light modulation layer comprises a first sub-modulation layer 117, a second sub-modulation layer 118 and a third sub-modulation layer 119.
3) As shown in FIG. 17, the polarization-independent light modulation layer 110 may comprise multiple sub-modulation layers, and the sub-modulation layers have different materials. The sub-modulation layers have a thickness of 60 nm to 1200 nm. One or more of the sub-modulation layers may not be penetrated by the modulation holes 116. The materials of the sub-modulation layers may include silicon, germanium, silicon germanium materials, silicon compounds, germanium compounds, metals, III-V materials and the like, wherein the silicon compounds include, but are not limited to, silicon nitride, silicon dioxide, carbide silicon and the like.
4) As shown in FIG. 18, the polarization-independent light modulation layer 110 is prepared by directly etching a structure on a light detection layer 122 of a back-illuminated CIS wafer, and an etching depth is 60 nm to 1200 nm. The modulation hole array of the light modulation layer 110 may be one or any combination of the above two solutions.

On the basis of the above embodiment, in the longitudinal structure, the light modulation layer may not be penetrated by the modulation column or the modulation hole. The modulation column may have a certain thickness. Specifically, it may be 60 nm to 1200 nm, and the thickness of the entire light modulation layer may be 120 nm to 2000 nm. The thickness of the modulation hole may be 160 nm to 1000 nm, and the thickness of the entire light modulation layer is 220 nm to 1500 nm.

On the basis of the foregoing embodiment, in the longitudinal structure, the light modulation layer may be composed of two different materials, a silicon layer and a metal layer. The thickness of the silicon layer may be 60 nm to 1200 nm, and the thickness of the metal layer may be 60 nm to 1200 nm.

In summary, the spectral imaging chip provided in the embodiment of the present application has the following effects: 1) The spectral imaging chip can realize the collection of image information and spectral information, and also provides spectral information of different points in the field of view while providing complete image information. 2) The preparation of the spectral chip can be completed through a CMOS process to tape out at one time, which is to advantageous to reduce the failure rate of the component, improve the finished product yield of the component and reduce the cost. 3) The light modulation layer and the image sensing layer are monolithically integrated without discrete elements, which is advantageous to improve the stability of the component and greatly promote the miniaturization and light weight of the image sensor. 4) Monolithic integration is realized at the wafer level, and the distance between the sensor and the light modulation layer can be minimized, which is advantageous to reduce the size of the unit, achieving higher resolution and reducing packaging costs.

Figure 19:
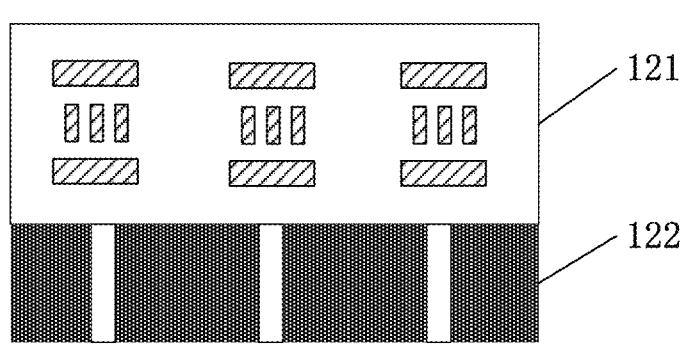
FIG. 19 illustrates a schematic structural diagram of a CIS wafer in the spectral imaging chip provided by the present application.

On the basis of the foregoing embodiment, an image sensing layer in an embodiment of the present application is specifically a CIS wafer, and the CIS wafer may be either front-illuminated or back-illuminated. As shown in FIG. 19, it is a front-illuminated CIS wafer. The front-illuminated CIS wafer comprises a light detection layer 122 and a metal wire layer 121 connected along the thickness direction of the image sensor layer. The light detection layer 122 is below the metal wire layer 121. The CIS wafer is not integrated with micro lenses and filters. The light modulation layer is directly integrated on the metal wire layer 121. The metal line layer 121 is used to perform preliminary signal processing on the spectral signal received by the wafer to first convert light signal data into an electrical signal, which can speed up the processing efficiency of the signal processing circuit layer, and make the signal conversion and signal operation processing more stable and more accurate.

Figure 20:
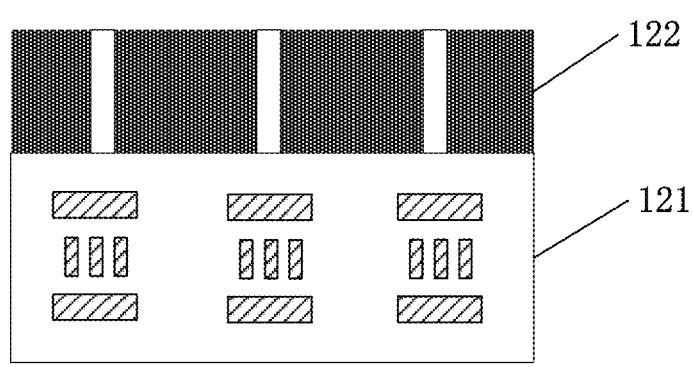
FIG. 20 illustrates a schematic structural diagram of a CIS wafer in the spectral imaging chip provided by the present application.

As shown in FIG. 20, it is a back-illuminated CIS wafer. The back-illuminated CIS wafer comprises a light detection layer 122 and a metal wire layer 121 connected along the thickness direction of the image sensor layer. The light detection layer is not integrated with micro lenses and filters. The light modulation layer is directly integrated on the light detection layer 122. Since a target light beam passes through the light modulation layer and then directly irradiates the light detection layer 122, the adverse influence of the metal wire layer on the target light beam can be effectively eliminated in this way improving the quantum efficiency of the spectral imaging chip.

Figure 21A:
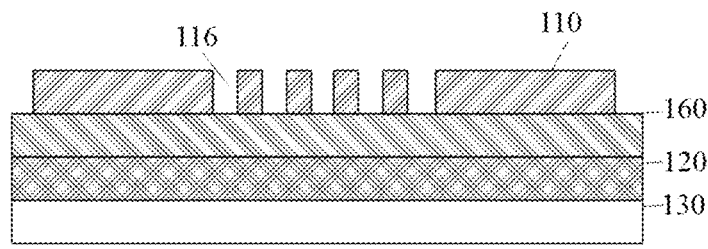
FIG. 21a illustrates a schematic structural diagram of a spectral imaging chip provided by the present application.
Figure 21B:
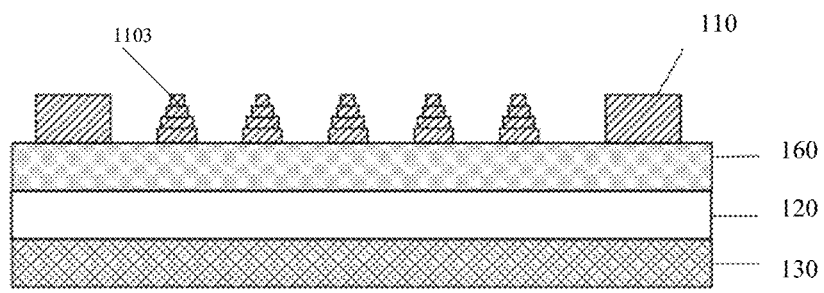
FIG. 21b illustrates a schematic structural diagram of a spectral imaging chip provided by the present application.

On the basis of the foregoing embodiment, as shown in FIGS. 21a and 21b, the spectral imaging chip further comprises a light-transmitting medium layer 160, and the light-transmitting medium layer 160 is located between the light modulation layer 110 and the image sensing layer 120. The modulation unit of the light modulation layer 110 in FIG. 21a includes a modulation hole 116, and the modulation unit of the light modulation layer 110 in FIG. 21b includes a modulation column 1103. The thickness of the light-transmitting medium layer 160 is 50 nm to 1 μm, and the material may be silicon dioxide. If it is a process solution of direct deposition and growth, the light-transmitting dielectric layer 160 may be covered on the image sensor layer 120 by chemical vapor deposition, sputtering, spin coating or the like, and then the light modulation layer is deposited and etched above it. If it is a transfer process solution, then the light modulation layer may be first processed on the silicon dioxide, and then the two parts are transferred onto the image sensing layer 120 as a whole.

It is worth mentioning that in some application scenes, the purpose of using the spectral imaging chip and its corresponding camera module or apparatus is to obtain a relatively high imaging quality image of the captured object. For example, an image with the color and texture closer to the actual color and texture of the captured object is obtained through the spectral imaging chip. Correspondingly, in these application scenes, the focus of the information processing method is to obtain image information of the captured object, and then use the obtained spectral information to adjust the obtained image.

In these application scenes, preferably, the image information of the captured object obtained by the spectral imaging chip is relatively complete and accurate, so that the image generated based on the image information of the captured object is also relatively complete and accurate. Correspondingly, the spectral information of the captured object obtained by the spectral imaging chip can be understood as auxiliary information used to assist in image adjustment.

Correspondingly, in these application scenes, preferably, the entire area of the modulation units 1101 of the spectral imaging chip accounts for 0 to 25% of the area of an effective region of the spectral imaging chip. Here, the effective region of the spectral imaging chip refers to a region for obtaining light frequency information and light intensity information in the spectral imaging chip. That is, preferably, in these application scenes, the total area of the modulation units 1101 in the spectral imaging chip accounts for no more than 25% of the area of the effective region of the spectral imaging chip. In this way, the modulation units 1101, which occupy a relatively small area ratio, can obtain spectral information about the captured object for image adjustment, whereas the non-modulation units 1102, which occupy a relatively large area ratio, can ensure that sufficient light intensity information is obtained, so as to restore an image with higher quality. Then, the image is adjusted according to the obtained spectral information, so that the finally obtained image has a relatively higher imaging quality, so that the imaging effect of the image is more realistic.

It is worth mentioning that in these application scenes, the ratio of the entire area occupied by the modulation units 1101 may be set and adjusted according to actual conditions. For example, 5%, 10%, 15%, 20% or the like may be selected. It is found by the inventors of the present application through tests that when the area ratio is 5% to 15%, the imaging quality of the final image obtained approaches and even exceeds the imaging quality of the image collected by the existing CMOS and CCD imaging chips under the matching of the algorithm.

In addition, in other application scenes, it is expected that the spectral imaging chip obtains relatively more spectral information, so that the relatively more to spectral information can be used to obtain more accurate feature or information description of the captured object. At the same time, it is also expected that the image information obtained by the spectral imaging chip is not excessively affected.

For example, when a terminal device configured with the spectral imaging chip is applied for biometric detection (for example, iris identification, fingerprint identification or the like), the existing biometric identification solution generally requires imaging of the iris or fingerprint to be identified to obtain texture information of the iris and fingerprint, and then the obtained texture information is matched with a preset standard to realize the identification function. However, in practical applications, some criminals use biological features copied on the prosthesis to crack. Therefore, in these application scenes, the function of living body detection is expected. The function of living body detection can be realized based on the spectral information of the captured object.

Correspondingly, in these application scenes, preferably, the entire area of the modulation units 1101 of the spectral imaging chip accounts for 20 to 45% of the area of an effective region of the spectral imaging chip. Here, the effective region of the spectral imaging chip refers to a region for obtaining spectral information and light intensity information in the spectral imaging chip. That is, preferably, in these application scenes, the total area of the modulation units 1101 in the spectral imaging chip accounts for 20% to 45% of the area of the effective region of the spectral imaging chip. In this way, the non-modulation unit 1102 with a large area ratio can also ensure that sufficient light intensity information is obtained so as to restore an image with higher quality. The modulation units 1101 with this area ratio can obtain the spectral information of the captured object used for image adjustment, and further, whether the captured object is a living body is judged based on the spectral information.

It is worth mentioning that in these application scenes, the area ratio to occupied by the modulation units 1101 as a whole can be set and adjusted according to actual conditions. For example, 25%, 30%, 35% or the like may be selected. It is found by the inventors of the present application through tests that when the area ratio is 25% to 35%, the spectral imaging chip can not only obtain biometric images with high quality, and the spectral information it obtains is also sufficient to accurately judge whether the captured object is a living body.

In addition, in other application scenes, it is expected that the requirements for obtaining the image information and spectral information of the captured object are similar. For example, in some application scenes, it is first necessary to identify or perceive the scenes through images, and then use the spectral information to perform spectral analysis on the scenes.

Correspondingly, in these application scenes, preferably, the entire area of the modulation units 1101 of the spectral imaging chip accounts for 45 to 65% of the area of an effective region of the spectral imaging chip. Here, the effective region of the spectral imaging chip refers to a region for obtaining spectral information and light intensity information in the spectral imaging chip. That is, preferably, in these application scenes, the total area of the modulation units 1101 in the spectral imaging chip accounts for 45% to 65% of the area of the effective region of the spectral imaging chip. In this way, the non-modulation units 1102 whose ratio is roughly equivalent to that of the modulation units 1101 can also ensure that sufficient light intensity information is obtained so as to restore an image with higher quality. The modulation units 1101 can obtain the spectral information of the captured object used for image adjustment.

It is worth mentioning that in these application scenes, the area ratio occupied by the modulation units 1101 as a whole can be set and adjusted according to actual conditions. For example, 55%, 60% or the like may be selected. It is found by the inventors of the present application through tests that when the area ratio is 50% to 55%, the spectral imaging chip can not only obtain biometric images with high quality, and the spectral information it obtains is also sufficient to judge whether the captured object is a living body. That is, more preferably, in these application examples, the area ratio is 50% to 55%.

In addition, in some other application scenes, the core requirement of the spectral imaging chip is to obtain the required information by performing accurate spectral analysis on the captured object, and to perform quantitative or qualitative analysis based on the obtained information. For example, the spectroscopic imaging chip is used to detect the protein in milk, detect the components, acidity or the like in the fruit, and monitor the water quality. In these application scenes, spectral information with higher accuracy is required, but the requirement for image information of the captured object is relatively low or basically unnecessary. That is, in these application scenes, the image information of the captured object is only used as auxiliary information (for example, to supervise some emergencies) or even as useless information.

Correspondingly, in these application scenes, preferably, the entire area of the modulation units 1101 of the spectral imaging chip accounts for more than 60% (more preferably, 80% to 95%) of the area of an effective region of the spectral imaging chip. Here, the effective region of the spectral imaging chip refers to a region for obtaining spectral information and light intensity information in the spectral imaging chip.

It is worth mentioning that in these application scenes, the area ratio occupied by the modulation units 1101 as a whole can be set and adjusted according to actual conditions. For example, 85%, 90% or the like may be selected. Of course, in the specific examples of these application scenes, the area ratio may be greater than 95%, and the present application is not limited thereto.

In addition, in some application scenes, the spectral imaging chip according to the present application is suitable for combining with an optical element to form an optical module, wherein the optical element is located on a photosensitive path of the spectral imaging chip for modulating light entering the spectral imaging chip. In a specific example, the optical element comprises, but is not limited to, a lens (or lens group), a diffractive element, and a diffusion element (for example, ground glass, etc.).

It should be known by those of ordinary skill in the art that for a camera module using a traditional CMOS imaging chip or CCD imaging chip as a photosensitive chip, when the field of view of the optical lens is too large (for example, when it exceeds 75°), it will cause distortion in the four corner regions and/or edge regions of the resulting image, which affects the imaging effect of the image. However, in the embodiment of the present application, the spectral information obtained by the spectral imaging chip is not applied to imaging, that is, image distortion does not affect the acquisition and analysis of spectral information.

Preferably, in these application scenes, the modulation units 1101 of the spectral imaging chip are arranged in the corner region and/or edge region of the spectral imaging chip (that is, the modulation units 1101 are arranged in the corner region and/or edge region of the light modulation layer 110), and the non-modulation units 1102 of the light modulation layer 110 are selected to be arranged in the middle region of the spectral imaging chip. In this way, the imaging is not affected, and the spectral information of the captured object can be obtained.

It is worth noting that in these application scenes, the corner region and the edge region of the spectral imaging chip include the edge and the corner of the effective region of the spectral imaging chip, and part of region adjacent to the corner and the edge. For example, in a specific example, a region whose distance from a central axis of the spectral imaging chip is less than or equal to 70% of the total length of the effective region in this direction may be positioned as a central region, and other regions of the effective region may be defined as the edge region and the corner region.

In addition, in some application scenes, it is expected that the spectral imaging chip can obtain spectral information of the captured object with higher accuracy. It should be understood that, for the spectral imaging chip, regardless of whether an optical element is configured, the accuracy of the information collected in the middle region thereof is higher.

Therefore, in these application scenes, preferably, the modulation units 1101 of the spectral imaging chip are arranged in a middle region of an effective region of the spectral imaging chip. Here, the effective region of the spectral imaging chip refers to a region for obtaining spectral information and light intensity information in the spectral imaging chip. That is, the quality of the spectral information of the captured object collected by the spectral imaging chip is optimized by adjusting the position. In these application scenes, the non-modulation units 1102 may be arranged around the modulation unit 1101 in a surrounding manner.

It is worth mentioning that in a spectral imaging chip according to an embodiment of the present application, a degree of sparsity of the modulation units 1101 also affects its imaging quality and spectral analysis. Therefore, the inventors of the present application also try to find a suitable degree of sparsity to improve the performance of the spectral imaging chip.

Figure 28:
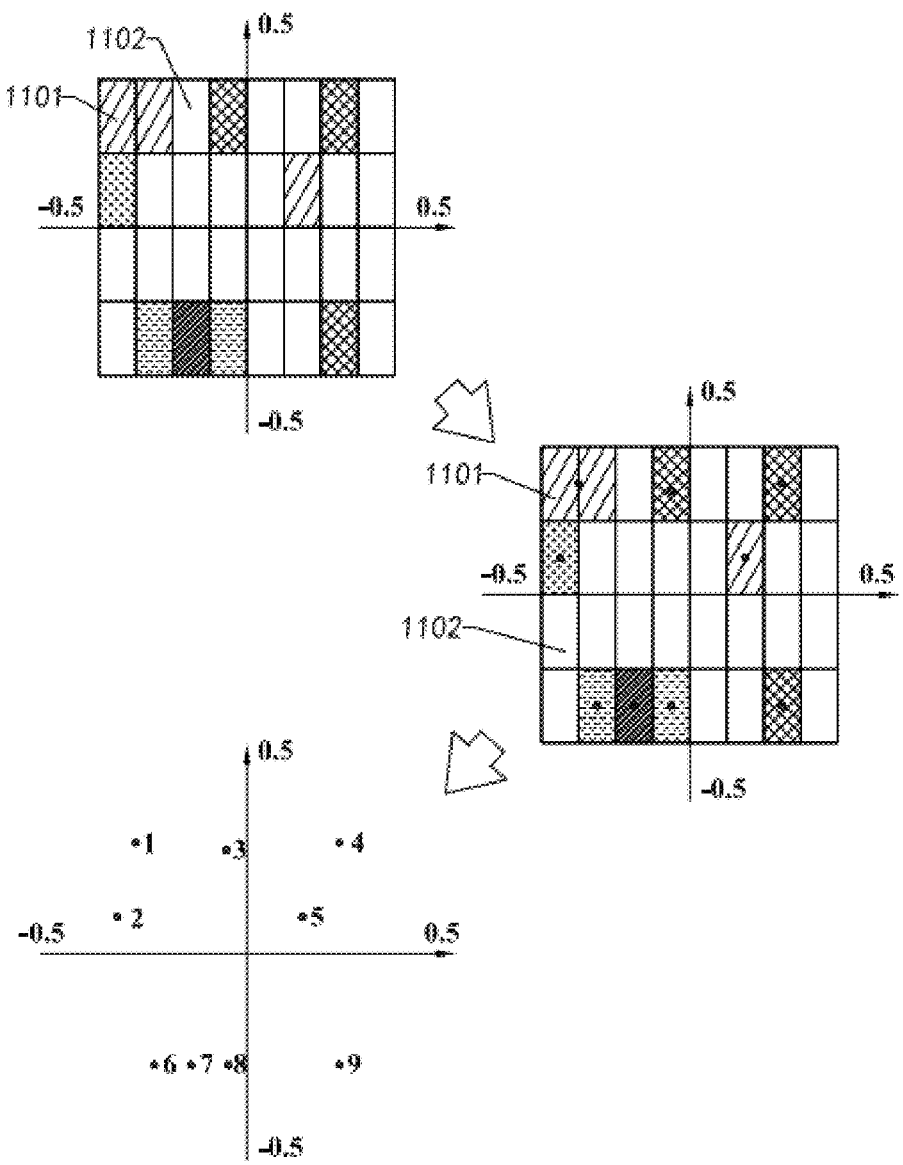
FIG. 28 illustrates a schematic diagram of a degree of sparsity of a light modulation layer of the spectral imaging chip according to an embodiment of the present application.

Specifically, in a specific example of the present application, the degree of sparsity is defined in the following manner: first, the side length of the spectral imaging chip is normalized, and geometric centers of the modulation units 1101 represent corresponding modulation units 1101; next, points corresponding to the modulation units 1101 are coded from 1 to n, and a distance between a geometric center of an i-th modulation unit 1101 and a geometric center of a j-th modulation unit 1101 (as shown in FIG. 28) is denoted by $d_{ij}$; and correspondingly, in this specific example, the degree of sparsity A can be calculated by the following formula:

$$A = \frac{\sum_{i<j \leq n} d_{ij/n}}{\sqrt{n}}.$$

Here, it is worth mentioning that in the above definition process, if two adjacent modulation units 1101 have the same structure, then the two modulation units 1101 can be regarded as one modulation unit 1101, and the geometric center of the two modulation units 1101 represents the integrated modulation unit 1101 to facilitate calculations.

In an embodiment of the present application, the degree of sparsity has a value of greater than 0 and less than or equal to 1. Preferably, the degree of sparsity is less than or equal to 0.5. Here, when the value of the degree of sparsity is less than or equal to 0.5, the arrangement density of the modulation units 1101 of the spectral imaging chip is relatively sparse. Therefore, the modulation units 1101 have less influence on the imaging of the spectral imaging chip, that is, it is advantageous for image restoration. In particular, when the value of the degree of sparsity is less than or equal to 0.15, the spectral imaging chip may be defined as a sparse spectral imaging chip, wherein the arrangement density of the modulation units 1101 of the sparse spectral imaging chip is relatively sparse, and the corresponding non-modulation units 1102 have a relatively high arrangement density. Through this configuration mode, the spectral imaging chip can obtain more and richer light intensity information, which is advantageous to improve the imaging quality of the images. Moreover, the spectral information of the captured object collected by the sparse spectral imaging chip can also be integrated with the image to improve the authenticity of the image.

In some examples of the present application, the degree of sparsity may also be set between 0.15 and 0.35. It may be understood that if the degree of sparsity of the spectral imaging chip is too low, it may cause incomplete or low-accuracy spectral information. Therefore, the value of the degree of sparsity can be appropriately increased to increase the density of the spectral information, so as to improve the accuracy of spectral information measurement.

In some other examples of the present application, the value range of the degree of sparsity is set to be between 0.5 and 1 (excluding 0.5). It should be understood that when the degree of sparsity value of the spectral imaging chip is relatively high, the arrangement density of the modulation units 1101 of the spectral imaging chip is relatively large. Therefore, the spectral imaging chip can be more applied in the application fields of spectral collection and analysis. Correspondingly, the image obtained by the spectral imaging chip may be used as auxiliary information to improve the accuracy of the spectral information. In these examples, preferably, the value of the degree of sparsity of the spectral imaging chip is greater than or equal to 0.85 to ensure that sufficient spectral information may be used. Of course, in some examples of the present application, the value range of the degree of sparsity is set to 0.65 to 0.85. At this time, the spectral imaging chip can collect relatively sufficient spectral information, and at the same time, it can also obtain an image a more suitable for auxiliary analysis to assist in and/or cooperate with complete spectrum analysis.

In some embodiments, as shown in FIGS. 22-27, the spectral imaging chip 100 further comprises at least one of a lens 140 and a filter 150, and at least one of the lens 140 and the filter 150 is connected to a side of the light modulation layer 110 away from or close to the image sensing layer 120.

Figure 22:
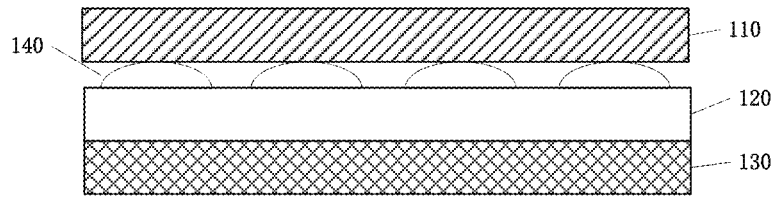
FIG. 22 illustrates a schematic structural diagram of a spectral imaging chip provided by the present application.

As shown in FIG. 22, the spectral imaging chip 100 is integrated with the lens 140, and the lens 140 is located on a side of the light modulation layer 110 close to the image sensing layer 120. That is, the lens 140 is located between the light modulation layer 110 and the image sensing layer 120.

Figure 23:
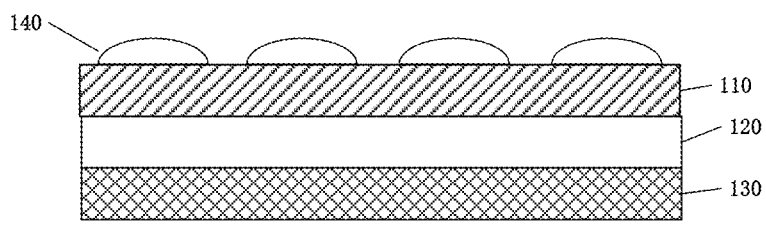
FIG. 23 illustrates a schematic structural diagram of a spectral imaging chip provided by the present application.

As shown in FIG. 23, the spectral imaging chip 100 is integrated with the lens 140, and the lens 140 is located on the side of the light modulation layer 110 away from the image sensing layer 120.

Figure 24:
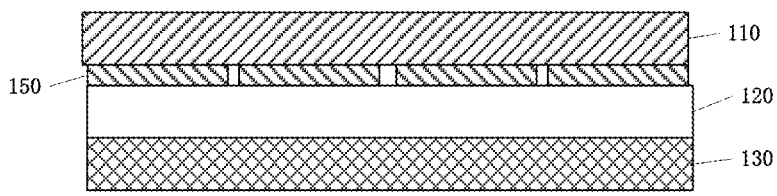
FIG. 24 illustrates a schematic structural diagram of a spectral imaging chip provided by the present application.

As shown in FIG. 24, the spectral imaging chip 100 is integrated with the filter 150, and the filter 150 is located on the side of the light modulation layer 110 close to the image sensing layer 120. That is, the filter 150 is located between the light modulation layer 110 and the image sensing layer 120.

Figure 25:
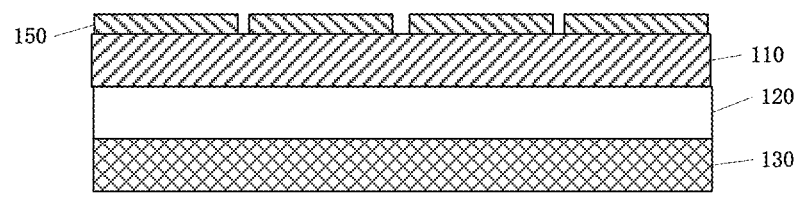
FIG. 25 illustrates a schematic structural diagram of a spectral imaging chip to provided by the present application.

As shown in FIG. 25, the spectral imaging chip 100 is integrated with the filter 150, and the filter 150 is located on the side of the light modulation layer 110 away from the image sensing layer 120.

Figure 26:
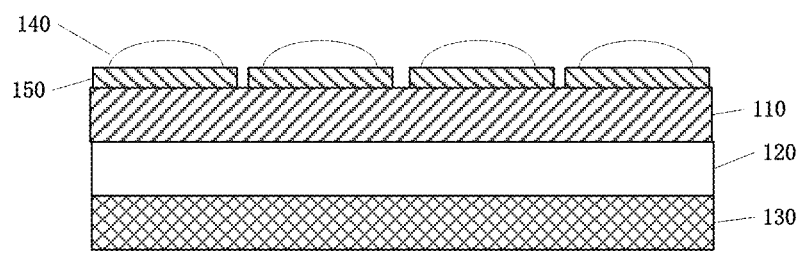
FIG. 26 illustrates a schematic structural diagram of a spectral imaging chip provided by the present application.

As shown in FIG. 26, the spectral imaging chip 100 is integrated with the lens 140 and the filter 150, the lens 140 and the filter 150 are located on the side of the light modulation layer 110 away from the image sensing layer 120, and the filter 150 is located between the lens 140 and the light modulation layer 110.

Figure 27:
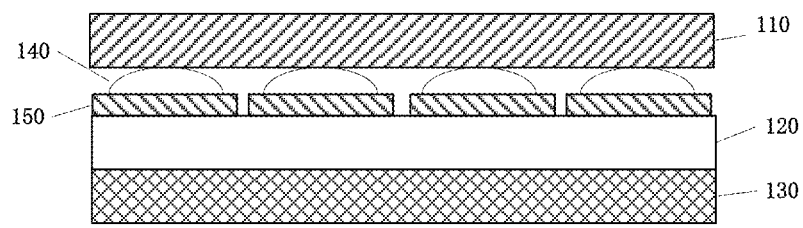
FIG. 27 illustrates a schematic structural diagram of a spectral imaging chip provided by the present application.

As shown in FIG. 27, the spectral imaging chip 100 is integrated with the lens 140 and the filter 150, and the lens 140 and the filter 150 are located on the side of the light modulation layer 110 close to the image sensing layer 120. That is, the lens 140 and the filter 150 are located between the light modulation layer 110 and the image sensing layer 120, and the light filter 150 is located between the lens 140 and the image sensing layer 120.

As shown in FIG. 1, based on various embodiments of the present application, a spectral identification apparatus is proposed. The apparatus comprises a light source module 300 and a spectral imaging chip 100. The light source module 300 is used to emit a spectrum to an object 200 to be imaged, so that the spectrum is reflected by the object 200 to be imaged, and then is incident onto the spectral imaging chip 100 as a target light beam. The spectral imaging chip 100 and the light source module 300 are provided on the same side of the object 200 to be imaged at the same time. The spectrum of visible-near-infrared light generated by the light source module 300 can irradiate the object 200 to be imaged, and under the action of reflection, the entire spectrum forms a target light beam that enters the spectral imaging chip 100. This structural arrangement can expand the detection space and improve the convenience of use for imaging and identification of the object.

It may be understood that the spectral imaging chip 100 and the spectral identification apparatus described in the present application can perform imaging and identification of any object 200 to be imaged. It is only necessary to adjust parameters such as the volume of each modulation unit 111 of the spectral imaging chip 100 and the corresponding wavelength of the incident light according to the imaging needs.

Preparation Method for Exemplary Spectral Imaging Chip

Figure 29:
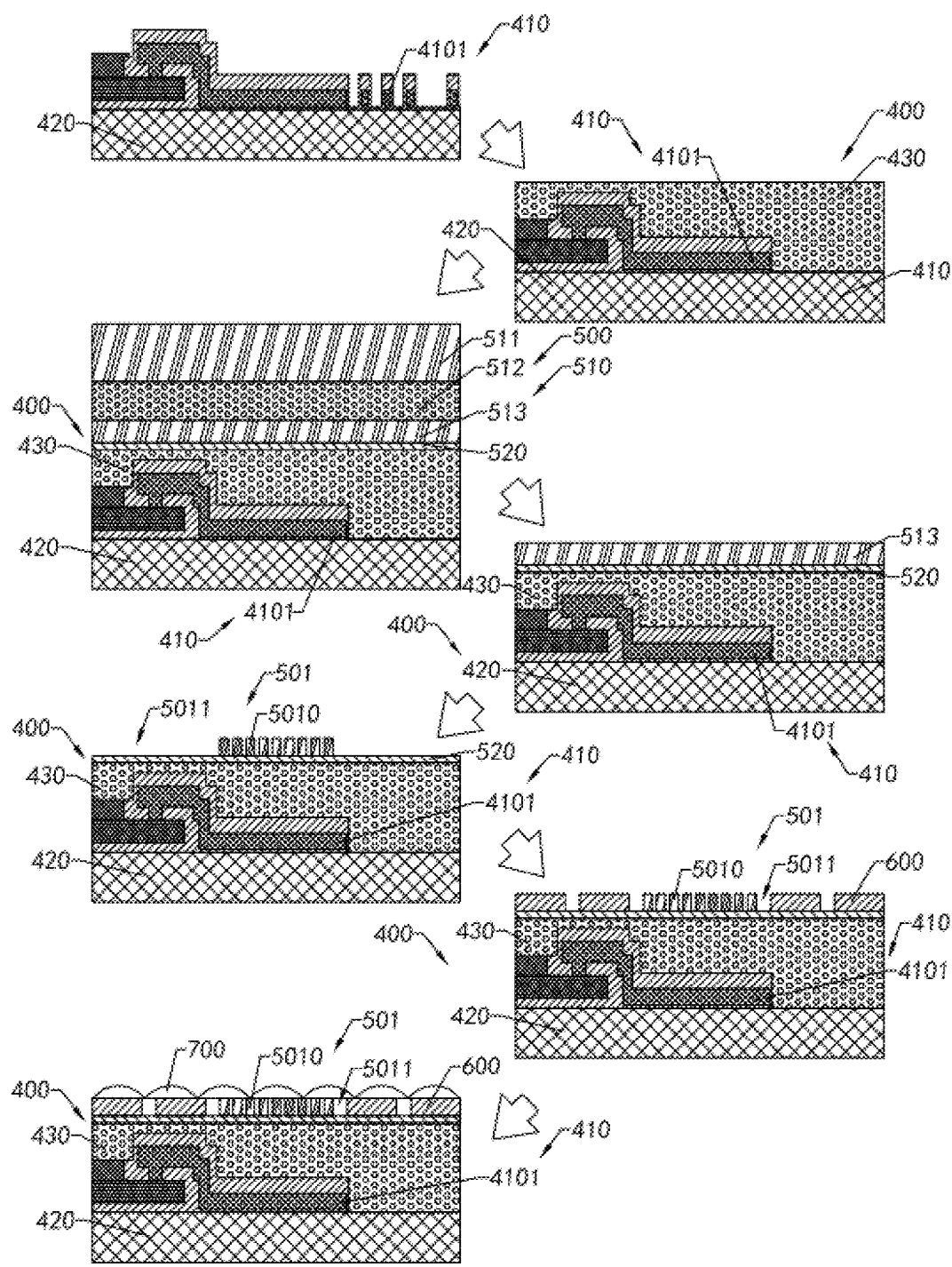
FIG. 29 illustrates a schematic diagram of a preparation process of the spectral imaging chip according to an embodiment of the present application.

FIG. 29 illustrates a schematic diagram of another specific example of a preparation method for the spectral imaging chip according to an embodiment of the present application. Here, the spectral imaging chip involved in the present application is applied to a computational spectrometer, wherein the most significant difference between the computational spectrometer and the traditional spectrometer lies in the difference in light filtering. In the traditional spectrometer, the filter used for wavelength selection is a bandpass filter. The higher the spectral resolution, the narrower bandpass and the more filters must be used, which increases the volume and complexity of the entire system. At the same time, when the spectral response curve becomes narrow, the light flux decreases, resulting in a decrease in the signal-to-noise ratio.

For the computational spectrometer, each filter adopts a broad spectrum filter, which makes the data detected by the computational spectrometer system appear completely different from the original spectrum. However, through applying a computational reconstruction algorithm, the original spectrum may be restored by calculation. Since broadband filters have more light passing through than narrowband filters, the computational spectrometer can detect spectra from darker scenes. In addition, according to the theory of compressed sensing, the spectral curve of the filter can be appropriately designed to restore the sparse spectrum with high probability, and the number of filters is much smaller than the expected number of spectral channels (recovering higher-dimensional vectors from lower-dimensional vectors), which is undoubtedly very advantageous for miniaturization. On the other hand, by using a larger number of filters, a regularization algorithm (which obtains a lower-dimensional vector after noise reduction from a higher-dimensional vector) can be used to reduce noise, which increases the signal-to-noise ratio and makes the entire system have higher robustness.

Relatively speaking, when designing the traditional spectrometer, filters need to be designed according to the required wavelengths (the effect thereof is equivalent to the light modulation structure of the spectral chip), so that light of a specific wavelength can be transmitted (generally, it is designed to enhance the projection of incident light of the specific wavelength, and the incident light of non-specific wavelength bands cannot be projected. By changing the structure period and diameter of nano disks or the like, the resonance conditions can be controlled, and the center wavelength of the incident light that can be enhanced can be changed, so as to realize the characteristics of light filtering). That is, the traditional spectrometer needs to focus on controlling the size and position accuracy of the light modulation structure in the design process, and at the same time, it is necessary to find ways to increase the transmittance of its specific wavelength. For computing spectrometers, it is necessary to enable light in a wider range of wavelengths (for example, 350 nm to 900 nm) to be received. Therefore, it is necessary to focus more on the refractive index during designing.

In particular, in an embodiment of the present application, the spectral imaging chip is prepared by the preparation method, so that the spectral imaging chip is formed with a light modulation layer having a regular crystal orientation structure on its surface, and the light modulation layer has a relatively large refractive index so that light in a relatively large range of wavelengths can be collected and utilized. Moreover, in the embodiment of the present application, the light modulation layer is provided with at least one modulation unit and at least one non-modulation unit along its surface, wherein the modulation unit is configured to collect light frequency information to obtain spectral information of the captured object, and the non-modulation unit is configured to collect light intensity information to obtain image information of the captured object.

As shown in FIG. 29, a preparation process for the spectral imaging chip according to an embodiment of the present application first comprises providing a semi-finished spectral chip 400, wherein the semi-finished spectral chip 400 comprises an image sensing layer 410 and a signal processing circuit layer 420 connected to the image sensing layer 410.

In this specific example, the semi-finished spectral chip 400 may be provided by a manufacturer, or may be obtained by processing an existing photosensitive chip. It should be known by those of ordinary skill in the art that the existing photosensitive chip, such as an CCD photosensitive chip or CMOS photosensitive chip, comprises a micro lens layer, a color filter layer (here, if it is a black-and-white chip, then it does not comprise a color filter layer), an image sensing layer 410, and a signal processing circuit layer 420. Correspondingly, the micro lens layer and color filter layer of the existing photosensitive chip may be removed (if it is a black-and-white chip, only the micro lens layer needs to be removed) to obtain the semi-finished spectral chip 400.

As shown in FIG. 29, in this specific example, the preparation process for the spectral imaging chip further comprises pre-treating a surface of the semi-finished product 400 of the spectral chip to form a flat combining surface for combining a transfer member 500 with a target transfer layer 510 on the surface of the semi-finished spectral chip 400.

Specifically, in this specific example, the process of pre-treating the surface of the semi-finished spectral chip 400 comprises: forming a light-transmissive medium layer 430 on the surface of the semi-finished spectral chip 400, wherein the light-transmissive medium layer 430 is made of a light-transmissive material and has relatively high light transmittance, so that it will not affect the light entering the semi-finished spectral chip 400.

It is worth mentioning that, in a specific implementation, although the light-transmissive medium layer 430 needs a relatively high refractive index, the refractive index of the light-transmissive medium layer 430 should not be too high in that it is necessary to ensure the difference in refractive index between the light-transmissive medium layer 430 and a semiconductor structure layer located thereon.

In this specific example, the material for making the transparent medium layer 430 is preferably silicide, such as silicon dioxide, silicon nitride and the like. It should be known by those of ordinary skill in the art that a refractive index of silicon to dioxide is about 1.45, and a refractive index of silicon nitride is between 1.9 and 2.3.

In a specific implementation, the light-transmissive medium layer 430 may be formed on the surface of the semi-finished spectral chip 400 by a process such as non-metal vapor deposition. Of course, in other embodiments of this specific implementation, the light-transmissive medium layer 430 may also be formed by other processes. For the forming process, it is not limited in the present application. In particular, in this specific example, the thickness dimension of the light-transmissive medium layer 430 is not limited in the present application, and its specific value may be adjusted according to the specific requirements of the application scene. In general, the thickness dimension thereof is less than or equal to 300 nm, and in some special scenes, it is even less than 100 nm.

As shown in FIG. 29, preferably, an upper surface of the light-transmissive medium layer 430 is a flat surface. In other words, a part of the upper surface of the light-transmissive medium layer 430 for combining the transfer member 500 has relatively high flatness, so as to facilitate the transfer of the transfer member 500 to the semi-finished spectral chip 400.

It is worth mentioning that in some cases of this specific example, the surface of the semi-finished spectral chip 400 may be uneven, and the upper surface of the light-transmissive medium layer 430 formed on the surface of the semi-finished spectral chip 400 by a deposition process may also be uneven. Therefore, in this specific implementation, the pretreating process further comprises: polishing and grinding the surface of the semi-finished spectral chip 400, and/or polishing and grinding the upper surface of the light-transmissive medium layer 430. Here, the polishing and grinding process may adopt a chemical mechanical polishing process, or other processes that can increase the flatness of the surface. For the process, it is not limited in the present application.

It is worth mentioning that in this specific example, if the surface flatness of the semi-finished spectral chip 400 meets preset requirements, then the light-transmissive medium layer 430 may not be provided on the surface of the semi-finished spectral chip 400. That is, it is not necessary to pre-treat the semi-finished spectral chip 400.

Further, as shown in FIG. 29, the preparation process of the spectral imaging chip further includes: providing a transfer member 500. In particular, in this specific example, the transfer member 500 is selected as an SOI (silicon on insolation) component, and comprises a silicon base layer 511, a silicide layer 512, and a silicon crystal layer 513 in order from bottom to top, wherein the silicon crystal layer 513 is a target transfer layer 510 of the transfer member 500. That is, in this specific example, the target transfer layer 510 of the transfer member 500 is located on the uppermost layer of the transfer member 500. It should be known by those of ordinary skill in the art that the SOI component is an existing component. The existing component is used as the transfer member 500, so that on the one hand, the cost can be reduced, and on the other hand, the existing component has matured in technological development and has stable and predictable performance. Of course, the transfer member 500 in an embodiment of the present application may also be other types of components, such as a silicon rod, a silicon wafer, or a silicon crystal and silicide combined component.

Moreover, it should be known by those of ordinary skill in the art that in the SOI component, the arrangement of atoms in the silicon base layer 511, the silicide layer 512, and the silicon crystal layer 513 are all regular. That is, the three all have good crystal orientation structures. Preferably, in this specific example, the surface of the silicon crystal layer 513 is a flat surface.

As shown in FIG. 29, the preparation process for the spectral imaging chip further comprises: bonding the upper surface of the transfer member 500 to the upper surface of the light-transmissive medium layer 430 of the semi-finished spectral chip 400, and coupling the transfer member 500 to the semi-finished spectral chip 400. That is, the surface of the silicon crystal layer 513 of the SOI component is bonded to the upper surface of the light-transmissive medium layer 430 of the semi-finished spectral chip 400 to migrate the SOI component to the semi-finished spectral chip 400.

In order to ensure the combining strength between the transfer member 500 and the semi-finished spectral chip 400, preferably, in an embodiment of the present application, the upper surface of the transfer member 500 preferably has a good bonding reaction with an upper surface of the light-transmitting medium layer 430, so that when the two surfaces are bonded, a good bonding reaction can be produced and a greater bonding force can be generated. For example, in this specific example, the upper surface of the transfer member 500 is configured to have the same material as the light-transmissive medium layer 430, so that the two can produce a good bonding reaction and generate a greater bonding force when they are bonded.

Taking the light-transmissive medium layer 430 as silicon dioxide as an example, it should be understood that in this specific example, the upper surface of the transfer member 500 is formed by the surface of the silicon crystal layer 513. Therefore, in this specific implementation, before bonding the upper surface of the transfer member 500 to the upper surface of the light-transmissive medium layer 430, the preparation process further comprises: treating the upper surface of the transfer member 500 so that the upper surface of the transfer member 500 is made of silicon dioxide material.

In a specific implementation, oxygen ions may be implanted into a surface of the silicon crystal layer 513 to form a silicon dioxide layer on part of the surface of the silicon crystal layer 513, so that the upper surface of the transfer member 500 is formed of silicon dioxide. It should be understood that the silicon crystal layer 513 has a regular crystal orientation structure. Therefore, the silicon dioxide layer also has a regular crystal orientation structure to facilitate the improvement of the bonding effect between it and the light-transmissive medium layer 430.

Of course, in other embodiments of the present application, a combining layer 520 may also be stacked on the surface of the silicon crystal layer 513, wherein the combining layer 520 is made of silicon dioxide material. For example, the combining layer 520 is formed through stacking on the surface of the silicon crystal layer 513 by a non-metal vapor deposition process, so as to improve the combining strength between the transfer member 500 and the semi-finished spectral chip 400 through the combining layer 520.

It is worth mentioning that, in this specific example, the process of treating the upper surface of the transfer member 500 may also be completed in the step of providing the transfer member 500, which is not limited in the present application.

As shown in FIG. 29, the preparation process for the spectral imaging chip further comprises: exposing the target transfer layer 510 of the transfer member 500, that is, exposing the silicon crystal layer 513 of the transfer member 500. In this specific example, one or a combination of mechanical grinding, chemical mechanical polishing, and etching processes may be used to remove the silicon base layer 511 and the silicide layer 512, so that the silicon crystal layer 513 of the transfer member 500 is exposed.

It is worth mentioning that mechanical grinding has high efficiency but poor accuracy, whereas chemical mechanical polishing and etching processes have low efficiency but high accuracy. Therefore, in this specific example, preferably, a first-stage treatment is first performed on the silicon base layer 511 and the silicide layer 512 by using mechanical grinding and polishing, and then a second-stage treatment is performed on the silicon base layer 511 and the silicide layer 512 by a chemical mechanical polishing or etching process to balance the efficiency and the accuracy.

In particular, in an embodiment of the present application, the refractive index of the silicon crystal layer 513 is about 3.42, and the difference in refractive index between the silicon crystal layer 513 and the light-transmissive medium layer 430 is greater than or equal to 0.5, preferably, greater than or equal to 0.7.

In particular, in this specific example, the spectral chip has certain requirements for the thickness of the silicon crystal layer 513. The thickness dimension of the silicon crystal layer 513 ranges from 5 nm to 1000 nm, preferably from 50 nm to 750 nm. The thickness facilitates the processing of the silicon base layer 511, so that the imaging effect of the spectral chip can be optimized and ensured. More preferably, the thickness dimension of the silicon crystal layer 513 is between 150 nm and 250 nm.

Correspondingly, in this specific example, in order to meet the thickness requirement, the process of removing the silicon base layer 511 and the silicide layer 512 further comprises removing a part of the silicon crystal layer 513, so that the thickness dimension of the silicon crystal layer 513 meets preset requirements.

As shown in FIG. 29, the preparation process for the spectral imaging chip further comprises: forming a light modulation layer 501 on the exposed silicon crystal layer 513, so that when external imaging light enters the spectral imaging chip through the light modulation layer 501, the light modulation layer 501 can modulate the imaging light, so as to extract and use the light frequency information and light intensity information in the imaging light.

Specifically, in an embodiment of the present application, the process of forming the light modulation layer 501 on the exposed silicon crystal layer 513 comprises: first, applying a photoresist on the silicon crystal layer 513, and then exposing the photoresist with a mask with a specific pattern; and then, removing a predetermined part of the silicon crystal layer 513 and the photoresist based on the specific pattern of the mask by an etching process, wherein the silicon crystal layer 513 that is not etched forms the light modulation layer 501.

As shown in FIG. 29, in an embodiment of the present application, the light modulation layer 501 comprises a modulation unit 5010 formed in the middle region thereof and a non-modulation unit 5011 formed around the modulation unit 5010 in a surrounding manner. That is, in the embodiment of the present application, the modulation unit 5010 of the light modulation layer 501 is located in the middle region of the light modulation layer 501, and its non-modulation unit 5011 is located around the light modulation unit 5010. It should be understood that in other examples of the present application, the modulation unit 5010 and the non-modulation unit 5011 of the light modulation layer 501 may also be laid out in other styles, which it is not limited in the present application.

In particular, each modulation unit 5010 may be a micro-nano structure unit for modulating the light beam entering the spectral imaging chip. Each non-modulation unit 5011 has no modulation capability, cannot modulate the target light beam, and directly transmits the imaging light. Moreover, in an embodiment of the present application, each modulation unit 5010 corresponds to at least one sensing unit 4101 of the image sensing layer 410, wherein the imaging light reaches the corresponding sensing unit 4101 after being modulated by the modulation unit 5010, and the sensing unit 4101 is used to obtain the light frequency information in the imaging light. At the same time, each non-modulation unit 5011 also corresponds to at least one sensing unit 4101 of the image sensor 410, wherein the imaging light reaches the corresponding sensing unit 4101 after being transmitted through the non-modulation unit 5011, and the sensing unit 4101 is used to obtain light intensity information in the imaging light. It is worth mentioning that different modulation units 5010 may have the same or different modulating effects on light of different wavelengths, and may be set as required, which is not specifically limited in the embodiment of this aspect.

In particular, in this specific example, the refractive index of the light modulation layer 501 is between 1 and 5, and the difference between the refractive index of the light modulation layer 501 and the refractive index of the light-transmissive medium layer 430 is greater than or equal to 0.5, preferably greater than or equal to 0.7. In this way, light of a relatively large range of wavelengths can be transmitted through the light-transmissive medium layer 430 and the image sensing layer 410 of the spectral chip after passing through the light modulation layer 501.

It is worth mentioning that in this specific example, the atoms in the silicon crystal layer 513 of the transfer member 500 have a regular distribution of crystal orientation, and the internal structure of the silicon crystal layer 513 has not changed when it is transferred onto the surface of the semi-finished spectral chip 400 by the preparation method as described above. Therefore, the spectral chip prepared according to the prepared method disclosed in this specific example has a light modulation layer 410 with a better crystal orientation arrangement formed on its surface.

As shown in FIG. 29, in an embodiment of the present application, the preparation method for the spectral imaging chip further comprises: forming a filter layer 600 at the non-modulation unit 5011 of the light modulation layer 501, so that when the imaging light passes through the non-modulation unit 5011, the filter layer 600 can perform color filter processing on light entering the sensing unit 4101 of the image sensor layer 410 to obtain light intensity information of a specific wavelength band in the imaging light. Here, the filter layer 600 may be implemented as a Bayer filter layer.

In particular, in some special examples of the present application, the thickness of the filter layer 600 is similar to or equal to the thickness of the light modulation unit 5010, so that the light modulation layer 501 and the filter layer 600 form a relatively flat surface.

In some embodiments, the spectral imaging chip does not need to form the filter layer 600. At this time, the non-modulation unit 5011 is optionally not treated, it is implemented as a silicon crystal layer 513, and light can be directly transmitted through the non-modulation unit 5011.

As shown in FIG. 29, in an embodiment of the present application, the preparation method for the spectral imaging chip further comprises: forming a micro lens layer 700 on the upper surface of the light modulation layer 501 and/or the filter layer, wherein the micro lens layer 700 comprises a plurality of micro lens units for converging the imaging light entering the light modulation layer 501 and the filter layer 600.

It is worth mentioning that, in an embodiment of the present application, the preparation method for the spectral imaging chip may also not form the micro lens layer 700 on the upper surface of the light modulation layer 501 and/or the filter layer. That is, in some examples of the present application, the spectral imaging chip does not comprise the micro lens layer 700, which is not limited in the present application.

In summary, the spectral imaging chip based on this specific example and the preparation method for the same are set forth. The specific preparation method is used to migrate the silicon crystal layer 513 with a better crystal orientation arrangement onto the surface of the semi-finished spectral chip 400, so that the surface of the finally prepared spectral imaging chip has a light modulation layer 501 with a better crystal orientation arrangement.

Figure 30:
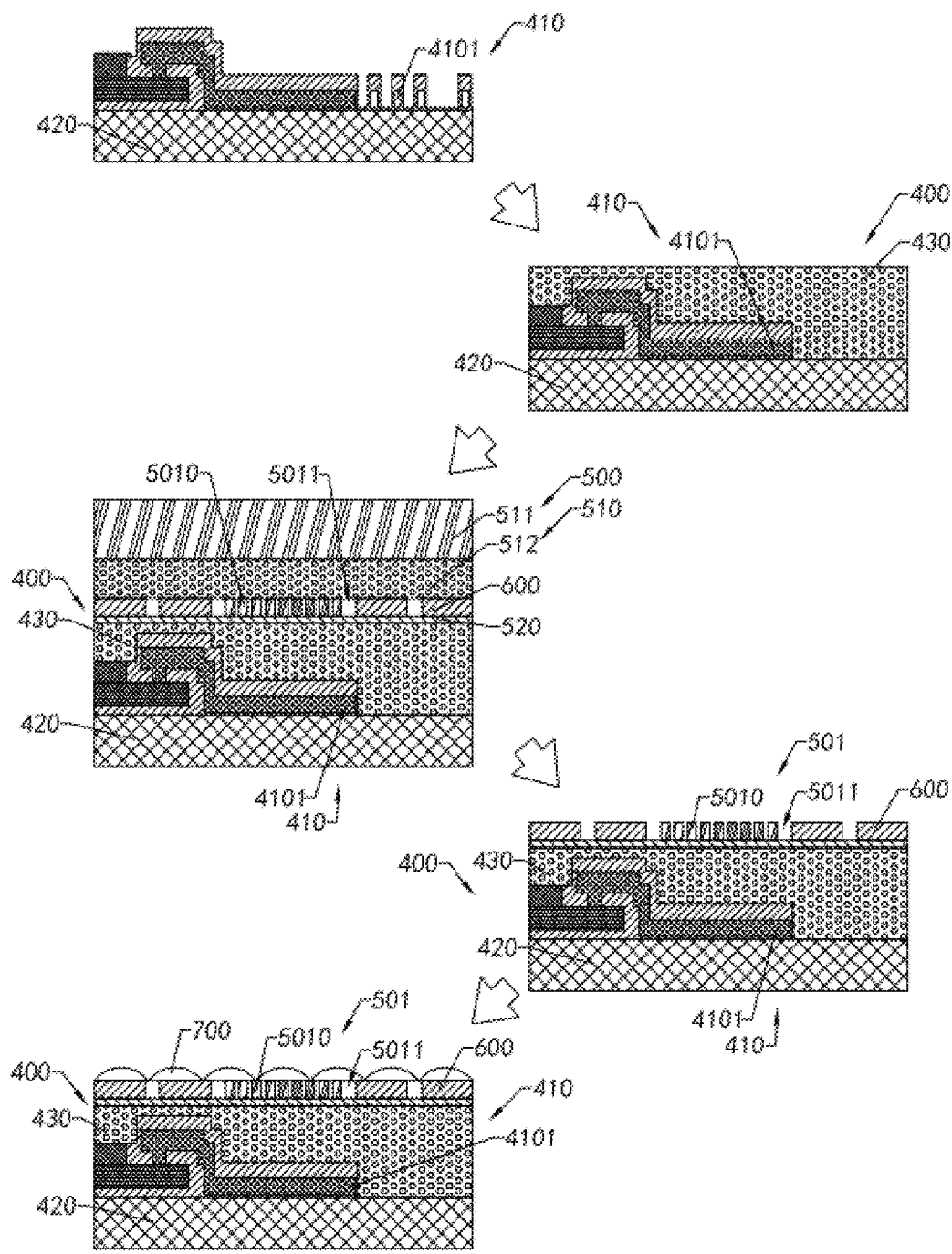
FIG. 30 illustrates a schematic diagram of a modified implementation of the preparation process of the spectral imaging chip according to an embodiment of the present application.

FIG. 30 illustrates a schematic diagram of a modified implementation of the preparation process of the spectral imaging chip according to an embodiment of the present application. As shown in FIG. 30, in this modified implementation, before the transfer member 500 is migrated to the semi-finished spectral chip 400 through a bonding process, the silicon crystal layer 513 of the transfer member 500 is pre-treated to form the light modulation layer 501, wherein the thickness of the light modulation layer 501 is 200 to 1000 nm, preferably 350 to 600 nm. Correspondingly, when the silicon crystal layer 513 is subsequently exposed, the light modulation layer 501 is also synchronously exposed.

That is, compared to the preparation solution shown in FIG. 29, in this modified embodiment, the light modulation layer 501 is prefabricated on the transfer member 500. In other words, the process of forming the light modulation layer 501 is adjusted forward.

Exemplary Fingerprint Living Body Identification Device and Fingerprint Module

Figure 31A:
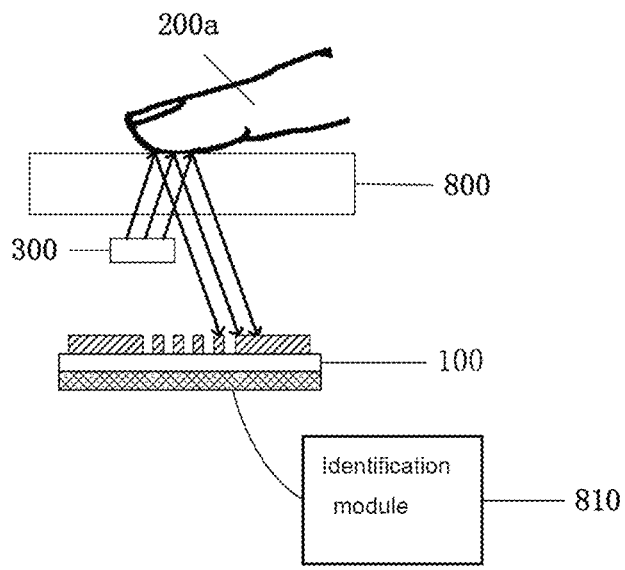
FIG. 31a is a schematic structural diagram of a fingerprint living body identification device provided by the present disclosure.
Figure 31B:
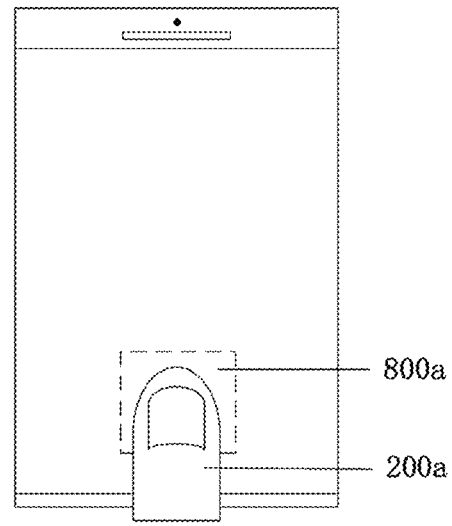
FIG. 31b is a top view of the fingerprint living body identification device provided by the present disclosure.

FIG. 31*a* is a schematic structural diagram of a fingerprint living body identification device provided in an embodiment of the present disclosure, and FIG. 31*b* is a top view of the fingerprint living body identification device provided in the embodiment of the present disclosure. As shown in FIGS. 31*a* and 31*b*, the fingerprint living body identification device comprises a display screen 800, a light source module 300, a spectral imaging chip 100, a signal processing circuit module, and an identification module 810. The signal processing circuit module is not separately shown in FIGS. 31*a* and 31*b*, because the signal processing circuit module may be integrated in the spectral imaging chip 100, or may be used as a part independent of the spectral imaging chip 100 in the fingerprint biometric device. For example, it may be a computer, which is not specifically limited in the embodiment of the present disclosure. The display screen 800 may comprises a cover glass, a touch module, and a display module. A fingerprint detection region 800*a* is provided on the display screen 800, and an object to be detected 200*a* can be placed in the fingerprint detection region 800*a*. The object 200*a* to be detected may be a user's own living fingerprint, or may be another person's living fingerprint, or may also be a sticker carrying fingerprint information, a 3D printing model or the like, which is not specifically limited in the embodiment of the present disclosure.

The light source module 300 is used to illuminate the object 200*a* to be detected in the fingerprint detection region. The light source module 300 may be a separate part independent of the display screen, such as an LED light source, or may be a laser light source of a certain wavelength, such as a 940 nm laser or the like. In addition, the light source module may also be integrated in the display screen 800 and is a part of the self-luminous display module in the display screen 800, which is not specifically limited in the embodiment of the present disclosure. The upper surface of the light source module 300 may be provided with a lens for condensing the light beam emitted by the light source module.

After being reflected by the object 200*a* to be detected, a target light beam can be obtained, and the target light beam is incident onto the spectral imaging chip 100. After irradiated by the target light beam, the pixel point corresponding to each modulation unit in the light modulation layer of the spectral imaging chip 100 has frequency spectrum information, and the pixel point corresponding to each non-modulation unit in the light modulation layer has light intensity information. The frequency spectrum information refers to light intensity information corresponding to light of different wavelengths at the pixel point corresponding to each modulation unit. Different modulation units may have the same or different modulating effects on light of different wavelengths, and can be set as required, which is not specifically limited in the embodiment of the present disclosure. Therefore, the spectral imaging chip 100 can determine the frequency spectrum information and the light intensity information. Then, the spectral information and image information of the object 200*a* to be detected are determined by the signal processing circuit module according to the frequency spectrum information and the light intensity information. When the signal processing circuit module is integrated in the spectral imaging chip, it can be considered that the spectral imaging chip has the function of determining the spectral information and image information of the object 200*a* to be detected.

In the fingerprint living body identification device, a vertical distance between the light source module and the display screen may have a value between 0 mm and 30 mm, and correspondingly, a vertical distance between the light source module and the spectral imaging chip may have a value between 0 mm and 30 mm. The vertical distance between the light source module and the display screen may also have a value between 0.5 mm and 20 mm, and correspondingly, the vertical distance between the light source module and the spectral imaging chip may have a value between 0.5 mm and 20 mm. It is worth mentioning that, for example, in some embodiments, the spectral imaging chip is attached to the display screen through an adhesive. Even if there is an adhesive between the spectral imaging chip and the display screen, it may be understood that the distance is 0 mm. That is, errors caused by assembly, fixing or the like do not affect the starting point of the present disclosure.

The identification module 810 is electrically connected to the signal processing circuit module. The identification module 810 may obtain the spectral information and image information of the object 200*a* to be detected determined by the signal processing circuit module, and identify whether the object 200*a* to be detected is a living fingerprint of a target user according to the spectral information and image information of the object 200*a* to be detected. The fingerprint image information and fingerprint spectral information of the target user may be pre-stored in the identification module 810. First, the image information of the object to be detected 200*a* determined by the spectral imaging chip 100 may be compared with the fingerprint image information of the target user pre-stored in the identification module 810. If the two are the same or the error is within a preset range, then it can be determined that the object to be detected is the target user's own object. Then, the spectral information of the object 200*a* to be detected determined by the spectral imaging chip 100 is compared with the fingerprint spectral information pre-stored in the identification module 810. If the two are the same or the error is within a preset range, then it can be determined that the object to be detected is the target user's own living fingerprint.

The fingerprint living body identification device provided in the embodiment of the present disclosure comprises a display screen, a light source module, a spectral imaging chip, a signal processing circuit module, and an identification module. A fingerprint detection region is provided on the display screen. A light source module illuminates an object to be detected in the fingerprint detection region. A target light beam obtained after reflected by the object to be detected is incident onto the spectral imaging chip. The frequency spectrum information and light intensity information are determined by the spectral imaging chip, and the spectral information and image information of the object to be detected are determined by the signal processing circuit module. Finally, according to the spectral information and image information of the object to be detected, it is identified by the identification module whether the object to be detected is the living fingerprint of the target user. Compared with the existing fingerprint identification device, the fingerprint living body identification device provided in the embodiment of the present disclosure can realize fingerprint living body identification, which is advantageous to improve the stability of the component performance while reducing the volume, weight and cost of the spectral component and greatly to improving the anti-counterfeiting capability of the fingerprint identification system. Moreover, compared with the traditional image sensor, the spectral imaging chip used in the embodiment of the present disclosure can obtain spectral information without affecting the spatial resolution and imaging quality of the resulting image, which is convenient for grasping more comprehensive information of the object to be detected. In addition, because the spectral information of the object to be detected can be used to uniquely identify the object to be detected, it can be determined whether the object to be detected is the live fingerprint of the target user through the spectral information of the object to be detected, which can improve the accuracy of detection and make the fingerprint identity verification realized by the fingerprint living body identification device more secure and reliable.

On the basis of the above-mentioned embodiments, in an fingerprint living body identification device provided in an embodiment of the present disclosure, the spectral imaging chip comprises: a light modulation layer and an image sensing layer stacked in sequence along a thickness direction; the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction; and the signal processing circuit module is electrically connected to the sensing unit. Specifically, the structure of the spectral imaging chip of FIG. 3 is applied to the fingerprint living body identification device in the embodiment of the present disclosure. As shown in FIG. 3, the spectral imaging chip 100 may comprise: a light modulation layer 110, an image sensing layer 120 and a signal processing circuit module 130. That is, the signal processing circuit module 130 is integrated in the spectral imaging chip 100 in the embodiment of the present disclosure. The light modulation layer 110, the image sensing layer 120, and the signal processing circuit module 130 are stacked in sequence along a thickness direction. The light modulation layer 110 has at least one modulation unit 1101 and at least one non-modulation unit 1102 distributed to along a surface. The image sensing layer 120 has a plurality of sensing units 1201 distributed along the surface, and each modulation unit 1101 and each non-modulation unit 1102 separately correspond to at least one sensing unit 1201 along the thickness direction. At least one modulation unit 1101, a plurality of non-modulation units 1102 around it and the corresponding sensing unit 120 constitute one pixel point of the spectral imaging chip 100. The signal processing circuit module 130 is electrically connected to the sensing unit 1201 on the image sensing layer 120, and the signal processing circuit module 130 is used to determine image information and spectral information of the object to be detected.

The details are the same as the embodiment of the spectral imaging chip, and the description will not be repeated here.

Each modulation unit 1101 may be a micro-nano structure unit for modulating the target light beam. Each non-modulation unit 1102 has no modulation capability and cannot modulate the target light beam. Each non-modulation unit 1102 may be a blank unit, or may be a physical unit that does not have the modulation capability but can directly transmit the target light beam and belongs to the same material as the modulation unit. Each modulation unit 1101 on the light modulation layer 110 may be directly prepared on a surface of a photosensitive region of the CIS wafer, while there are still traditional RGB or black and white pixels in the region where no modulation unit is prepared on the CIS wafer, which corresponds to the non-modulation unit on the light modulation layer. Since the light modulation layer of the spectral imaging chip comprises a modulation unit and a non-modulation unit, it can not only obtain frequency spectrum information of the pixel point corresponding to each modulation unit, i.e., frequency spectrum information detected by the corresponding sensing unit after modulated through each modulation unit, but also can obtain light intensity information of the pixel point corresponding to each non-modulation unit, i.e., light intensity information detected by the corresponding sensing unit after passing to through each non-modulation unit.

On the basis of the above-mentioned embodiments, in the fingerprint living body identification device provided in the embodiment of the present disclosure, the signal processing circuit module is specifically used for:

determining fitted light intensity information of the pixel point corresponding to each modulation unit based on light intensity information of pixel points corresponding to a plurality of non-modulation unit around each modulation unit after irradiated by the target light beam; and determining the image information of the object to be detected based on the fitted light intensity information of the pixel point corresponding to each modulation unit, and the light intensity information of the pixel point corresponding to each non-modulation unit.

Specifically, when the signal processing circuit module in the embodiment of the present disclosure determines the image information of the object to be detected, it may first determine fitted light intensity information of the pixel point corresponding to each modulation unit according to the light intensity information of pixel points corresponding to at least one non-modulation unit around each modulation unit after irradiated by the target light beam. "Around each modulation unit" refers to a position within a preset range from the modulation unit, and the preset range may be set as required, which is not specifically limited in the embodiment of the present disclosure. For example, "Around each modulation unit" may be 8 positions closest to the modulation unit on the left, top left, top, top right, right, bottom right, bottom, and bottom left, or may be positions that are the next closest to the modulation unit. The number of non-modulation units around each modulation unit is related to the structure of the light modulation layer. The light modulation layer is generally a rectangular structure. Taking the positions closest to the modulation unit around each modulation unit as an example for illustration, there are 3 units around each unit at the vertex positions, and 5 units around each unit at the edge positions other than the vertex positions, and 8 units around each unit at positions except the vertex positions and other edge positions. If the structure of the light modulation layer is as shown in FIG. 4, then there are at most 5 non-modulation units and at least 3 non-modulation units around each modulation unit; if the structure of the light modulation layer is as shown in FIG. 5, then there are at most 6 non-modulation units and at least 0 non-modulation units around each modulation unit; if the structure of the light modulation layer is as shown in FIG. 6, there are at most 4 non-modulation units and at least 0 non-modulation units around each modulation unit; and if the structure of the light modulation layer is as shown in FIG. 7, there are 8 non-modulation units around each modulation unit.

On the basis of the above-mentioned embodiments, a fingerprint living body identification device provided in an embodiment of the present disclosure further comprises: a lens group;
the light source module is disposed between the display screen and the spectral imaging chip, and the lens group is disposed between the light source module and the spectral imaging chip; or,
the light source module is disposed below a non-fingerprint detection region of the display screen, and the lens group and the spectral imaging chip are disposed in sequence below the fingerprint detection region; and
the lens group is used for collimating the target light beam onto the spectral imaging chip, so that the target light beam forms an image on the spectral imaging chip.

Figure 32:
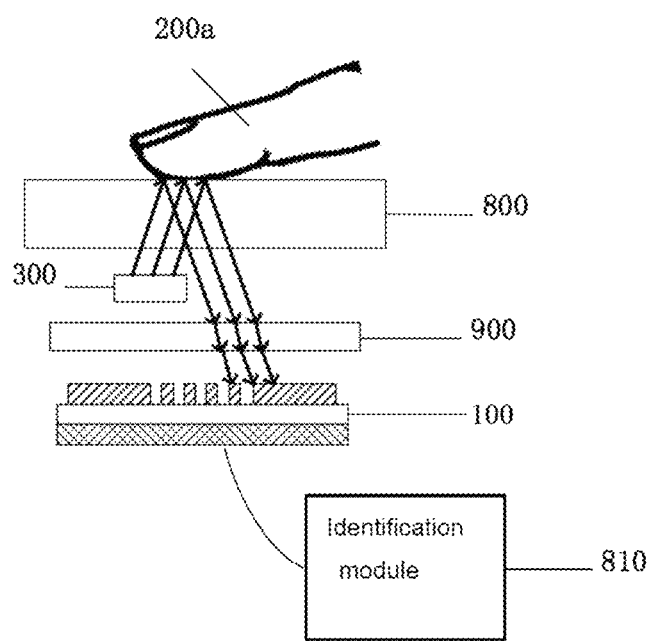
FIG. 32 is a schematic structural diagram of a fingerprint living body identification device provided by the present disclosure.

Specifically, as shown in FIG. 32, the lens group 900 is disposed between the display screen 800 and the spectral imaging chip 100, and the lens group 900 is disposed between the light source module 300 and the spectral imaging chip 100.

Figure 33:
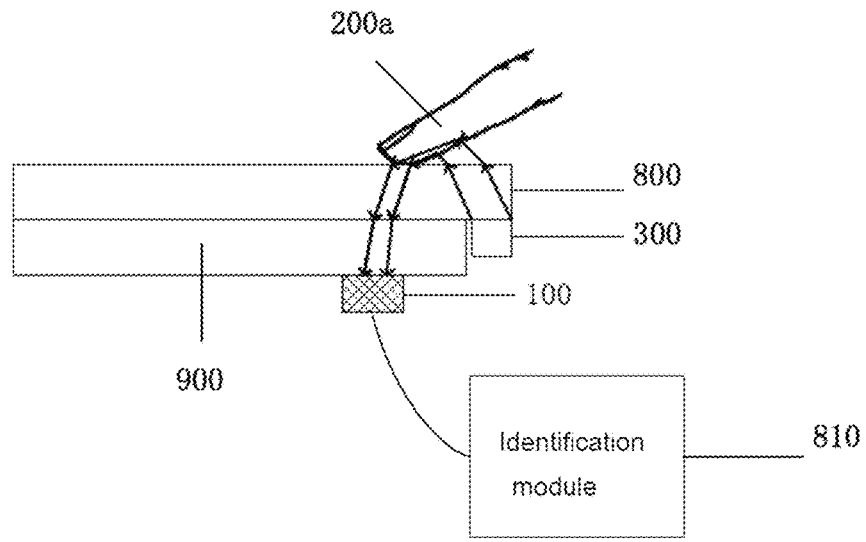
FIG. 33 is a schematic structural diagram of a fingerprint living body identification device provided by the present disclosure.

As shown in FIG. 33, the light source module 300 is disposed below the non-fingerprint detection region of the display screen 800, and the lens group 900 and the spectral imaging chip 100 are disposed in sequence below the fingerprint detection region 800a of the display screen 800.

A filter may be integrated in the lens group and used to filter out light in a specific wavelength range of interest, for example, to filter out light from 400 nm to 598 nm, and to remove other interference light. A vertical thickness of the lens module may be 0.5 mm to 20 mm. As a preferred solution, the vertical thickness of the lens module may be 5 mm to 10 mm.

The lens group can smoothly guide the target light beam to be incident on the spectral imaging chip to ensure that the target light beam forms an image on the spectral imaging chip.

Figure 34:
FIG. 34 is a schematic structural diagram of an optical fingerprint identification assembly provided by the present disclosure.

Further, as shown in FIG. 34, the present disclosure provides an optical fingerprint identification assembly. The optical fingerprint identification assembly comprises a display screen 800 and a fingerprint module 1000, wherein the fingerprint module 1000 is disposed at a lower end of the display screen 800, and wherein the display screen 800 may be implemented as an LCD screen, an OLED screen or the like. Further, the optical fingerprint identification assembly further comprises a light source module 300, the light source module 300 is disposed in a fingerprint living body identification device, and the light source module 300 is disposed corresponding to the fingerprint module 1000. During identification, the light source module 300 emits light to an object 200a to be detected, and after being reflected by the object 200a to be detected, a target light beam may be obtained. The target light beam is incident on the fingerprint module 1000 to be received.

In some embodiments, the fingerprint module is not necessarily used in combination with the display screen. That is, in the application of this embodiments, to the terminal product does not need to be provided with the display screen, and the fingerprint module may also realize identification of fingerprints.

It is worth mentioning that in some embodiments, the light source module 300 is integrated in the display screen 800. For example, when the display screen 800 is implemented as an OLED screen, the light beam projected by the display screen itself may be used to assist in identifying the object 200a to be detected.

Figure 35:
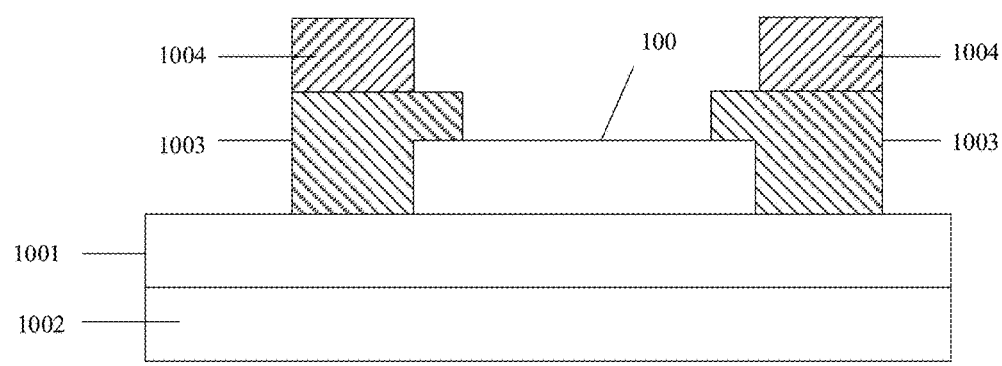
FIG. 35 is a schematic structural diagram of a fingerprint module provided by the present disclosure.

Further, as shown in FIG. 35, the fingerprint module 1000 comprises a spectral imaging chip 100 and a circuit board 1001. The spectral imaging chip 100 is electrically connected to the circuit board 1001. Preferably, the spectral imaging chip 100 is attached to the circuit board 1001. The circuit board 1001 may be implemented as a rigid board (Printed Circuit Board, PCB), a flex board (Flexible Printed Circuit, FPC), a flex-rigid board (F-PCB), a ceramic substrate, or the like, and it is mainly used for conducting and/or supporting the spectral imaging chip 100.

Further, for example, the spectral imaging chip 100 is attached to the circuit board 1001, the spectral imaging chip 100 may be conducted to the circuit board 1001 by wiring, or may be conducted directly behind the pad. In some embodiments, the fingerprint module further comprises a reinforcing plate 1002, and the reinforcing plate 1002 is attached to the circuit board 1001 to enhance the reliability and strength of the fingerprint module 1000. In some embodiments, the fingerprint module 1000 further comprises a packaging portion 1003, and the packaging portion is molded on an upper surface of the circuit board 1001. The packaging portion 1003 may be implemented as being integrally molded on the circuit board by a molding process, or may be implemented as a glue-like object applied to the circuit board 1001. It is worth mentioning that the packaging portion 1003 may also be integrally wrapped around the leads for conduction. The packaging portion 1003 is advantageous to improve the reliability of the fingerprint module. Further, the packaging portion 1003 has a flat surface, so that the fingerprint module is better attached to the display screen 800. Due to the existence of the reinforcing board 1002, the circuit board may be implemented as a flexible printed circuit, thereby reducing the thickness of the fingerprint module. In some embodiments, further, the fingerprint module 1000 may further comprises a light-shielding portion 1004, and the light-shielding portion 1004 is disposed on an upper surface of the packaging portion 1003 to prevent stray light from entering and affecting imaging. The light-shielding portion may be implemented as foam.

Figure 36:
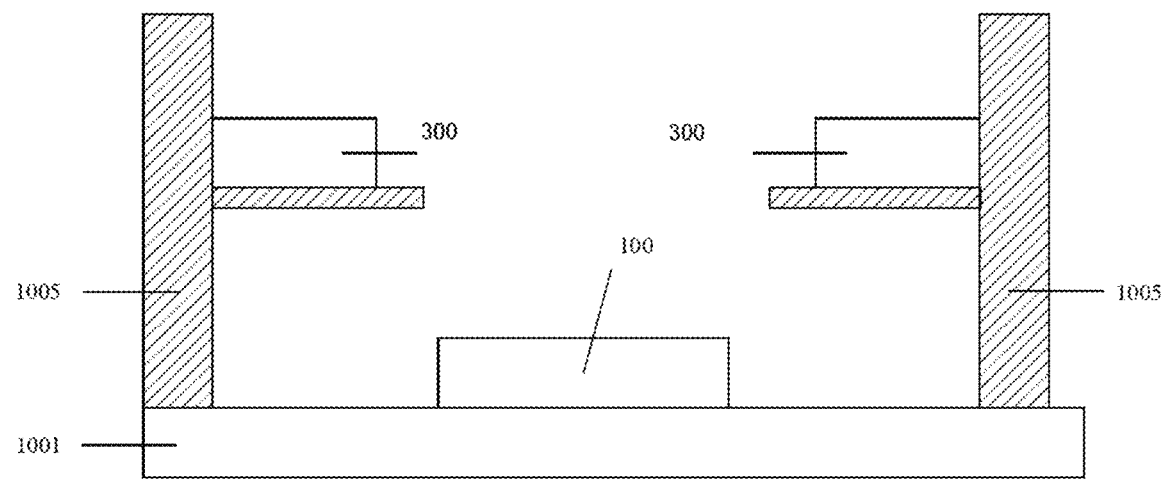
FIG. 36 is a schematic structural diagram of a fingerprint module provided by the present disclosure.

In another embodiment of the present disclosure, as shown in FIG. 36, the fingerprint module 1000 comprises a spectral imaging chip 100, a circuit board 1001, a bracket 1005, and a light source module 300. The spectral imaging chip 100 and the bracket 1005 are fixed to the circuit board 1001, and the light source module 300 is fixed to the bracket 1005.

Further, the fingerprint module in the embodiment of the present disclosure may further comprise a lens group for optical focusing, and the lens group is disposed on a photosensitive path of the spectral imaging chip 100. The lens assembly may be a vertical collimator lens, a film lens, a micro lens array, a wide-angle lens or the like.

The device embodiments described above are merely schematic, wherein the units described as separate members may or may not be physically separated, and the members displayed as units may or may not be physical units. That is, they may be located in one place, or may be distributed to a plurality of network units. Some or all of the modules may be selected according to actual needs to achieve the purpose of the solutions of the embodiments. They can be understood and implemented by those of ordinary skill in the art without creative skills.

Through the description of the above implementations, those skilled in the art can clearly understand that each implementation may be implemented by means of software plus a necessary general hardware platform, and of course, it may also be implemented by hardware. Based on this understanding, the above technical solutions essentially or the part that contributes to the prior art can be embodied in the form of a software product. The computer software product may be stored in a computer-readable storage medium such as a ROM/RAM, a magnetic disc or an optical disc, and includes several instructions so that a computer apparatus (which may be a personal computer, a server, a network apparatus or the like) executes the methods described in the embodiments or some parts of the embodiments.

Finally, it should be noted that the above embodiments are only used to illustrate the technical solutions of the present application, and are not intended to be limiting. Although the present disclosure has been described in detail with reference to the foregoing embodiments, it should be understood by those of ordinary skill in the art that it is still possible to make modifications of the technical solutions described in the foregoing embodiments or equivalent replacements of some technical features therein. However, these modifications or replacements do not cause the essence of corresponding technical solutions to deviate from the spirit and scope of the technical solutions of the embodiments of the present application.

The invention claimed is:

1. A spectral imaging chip, comprising:
an image sensing layer comprising a plurality of sensing units; and
a light modulation layer located on a photosensitive path of the image sensing layer, the light modulation layer comprising at least one modulation unit and at least one non-modulation unit spaced apart from the at least one modulation unit, wherein each modulation unit corresponds to at least one sensing unit along the photosensitive path, and each non-modulation unit corresponds to at least one sensing unit along the photosensitive path;
wherein the modulation unit of the light modulation layer is configured to modulate imaging light entering the sensing unit corresponding thereto, and the sensing unit corresponding thereto is adapted to obtain frequency spectrum information of the imaging light; and wherein the non-modulation unit of the light modulation layer is configured to not modulate the imaging light entering the sensing unit corresponding thereto, and the sensing unit corresponding thereto is adapted to obtain light intensity information of the imaging light;
wherein the spectral imaging chip defines a degree of sparsity of the modulation unit through a sparsity A, wherein the expression of the sparsity A is as follows:

$$A = \frac{\sum_{i<j\leq n} d_{ij}/n}{\sqrt{n}}$$

wherein n is points corresponding to the modulation unit which are coded from 1 to n, and a distance between a geometric center of an i-th modulation unit and a geometric center of a j-th modulation unit is denoted by dij;
wherein the sparsity A of the modulation unit is configured to judge the performance of the spectral imaging chip.

2. The spectral imaging chip according to claim 1, wherein the at least one modulation unit and the at least one non-modulation unit are located on the same plane.

3. The spectral imaging chip according to claim 2, wherein a ratio of the area of the modulation unit of the light modulation layer to the area of an effective region of the light modulation layer is greater than 0 and less than or equal to 25%, and wherein the effective region of the light modulation layer is a region set by the modulation unit and the non-modulation unit of the light modulation layer.

4. The spectral imaging chip according to claim 2, wherein the non-modulation unit of the light modulation layer is located in an edge region of the light modulation layer or a middle region of the light modulation layer.

5. The spectral imaging chip according to claim 2, wherein the sparsity A of the modulation unit of the light modulation layer is greater than 0 and less than or equal to 0.5.

6. The spectral imaging chip according to claim 1, further comprising a signal processing circuit module electrically connected to the sensing unit of the image sensing layer, wherein the spectral imaging chip and the signal processing circuit module are two independent parts, or the signal processing circuit module, configured as a signal processing circuit layer, is integrated in the spectral imaging chip.

7. The spectral imaging chip according to claim 1, further comprising a light-transmissive medium layer integrally formed on the image sensing layer, wherein an upper surface of the light-transmissive medium layer is a flat surface, and the light-transmissive medium layer is located between the image sensing layer and the light modulation layer.

8. The spectral imaging chip according to claim 7, wherein a difference in refractive index between the light modulation layer and the light-transmissive medium layer is greater than or equal to 0.5.

9. The spectral imaging chip according to claim 1, wherein each modulation unit in the light modulation layer comprises a plurality of modulation subunits, and an arrangement of all modulation subunits in each modulation unit has C4 symmetry.

10. An information processing method suitable for a spectral imaging chip, comprising:

obtaining frequency spectrum information from a pixel point corresponding to each modulation unit in a modulation layer of the spectral imaging chip and light intensity information of a pixel point corresponding to each non-modulation unit in the modulation layer; and determining spectral information of a captured object based on the frequency spectrum information of the pixel point corresponding to each modulation unit, and determining image information of the captured object based on the light intensity information of the pixel point corresponding to each non-modulation unit;

wherein the spectral imaging chip defines a degree of sparsity of the modulation unit through a sparsity A, wherein the expression of the sparsity A is as follows:

$$A = \frac{\sum_{i<j\leq n} d_{ij}/n}{\sqrt{n}}$$

wherein n is points corresponding to the modulation unit which are coded from 1 to n, and a distance between a geometric center of an i-th modulation unit and a geometric center of a j-th modulation unit is denoted by dij;

wherein the sparsity A of the modulation unit is configured to judge the performance of the spectral imaging chip.

11. The information processing method suitable for the spectral imaging chip according to claim 10, wherein the modulation unit of the light modulation layer is configured to modulate imaging light entering the pixel point corresponding thereto, and the pixel point corresponding thereto is adapted to obtain frequency spectrum information of the imaging light; and wherein the non-modulation unit of the light modulation layer is configured to not modulate the imaging light entering the pixel point corresponding thereto, and the pixel point corresponding thereto is adapted to obtain light intensity information of the imaging light.

12. The information processing method suitable for the spectral imaging chip according to claim 11, wherein said determining the image information of the captured object based on the light intensity information of the pixel point corresponding to each non-modulation unit comprises:

determining fitted light intensity information of the pixel point corresponding to each modulation unit based on light intensity information of pixel points corresponding to at least one non-modulation unit around each modulation unit; and determining the image information of the captured object based on the fitted light intensity information of the pixel point corresponding to each modulation unit and the light intensity information of the pixel point corresponding to each non-modulation unit.

13. The information processing method suitable for the spectral imaging chip according to claim 12, wherein said determining the fitted light intensity information of the pixel point corresponding to each modulation unit based on the light intensity information of pixel points corresponding to the at least one non-modulation unit around each modulation unit comprises:

filtering the light intensity information of the pixel points corresponding to at least one non-modulation unit around any one of the modulation units based on a smoothing filtering method, so as to obtain fitted light intensity information of the pixel point corresponding to any one of the modulation units.

14. The information processing method suitable for the spectral imaging chip according to claim 13, wherein said determining the image information of the captured object based on the fitted light intensity information of the pixel point corresponding to each modulation unit and the light intensity information of the pixel point corresponding to each non-modulation unit comprises:

inputting an initial image obtained based on the light intensity information of the pixel points corresponding to all of the non-modulation units into a fitting model to obtain image information of the captured object output by the fitting model; and wherein the fitting model is constructed based on an adversarial neural network, and the fitting model is obtained by training based on a missing sample image with blank pixels and a complete sample image label without blank pixels corresponding to the missing sample image.

15. The information processing method suitable for the spectral imaging chip according to claim 14, wherein a training process of the fitting model comprises:

training a generator in the adversarial neural network based on the missing sample image and the complete sample image label corresponding to the missing sample image, and performing competitive discrimination on the trained generator based on a discriminator in the adversarial neural network; and using the generator obtained by training as the fitting model.

16. A fingerprint living body identification device, comprising a display screen, a light source module, a spectral imaging chip, a signal processing circuit module, and an identification module, wherein a fingerprint detection region is provided on the display screen; the light source module is used for irradiating an object to be detected in the fingerprint detection region, and a target light beam obtained after being reflected by the object to be detected is incident onto the spectral imaging chip; the spectral imaging chip and the signal processing circuit module are two independent parts, or the signal processing circuit module is integrated in the spectral imaging chip;

the spectral imaging chip is used for determining frequency spectrum information of a pixel point corresponding to each modulation unit in the light modulation layer of the spectral imaging chip and light intensity information of a pixel point corresponding to each non-modulation unit in the light modulation layer after irradiated by the target light beam; the signal processing circuit module is used for determining spectral information of the object to be detected based on the frequency spectrum information, and determining image information of the object to be detected based on the light intensity information; and the identification module is used for identifying whether the object to be detected is a living fingerprint of a target user based on the spectral information and image information of the object to be detected;

wherein the spectral imaging chip defines a degree of sparsity of the modulation unit through a sparsity A, wherein the expression of the sparsity A is as follows:

$$A = \frac{\sum_{i<j\leq n} d_{ij}/n}{\sqrt{n}}$$

wherein n is points corresponding to the modulation unit which are coded from 1 to n, and a distance between a geometric center of an i-th modulation unit and a geometric center of a j-th modulation unit is denoted by dij;

wherein the sparsity A of the modulation unit is configured to judge the performance of the spectral imaging chip.

17. The fingerprint living body identification device according to claim 16, wherein the spectral imaging chip comprises: a light modulation layer and an image sensing layer stacked in sequence along a thickness direction; the light modulation layer has at least one modulation unit and at least one non-modulation unit distributed along a surface; the image sensing layer has a plurality of sensing units distributed along a surface, and each modulation unit and each non-modulation unit separately correspond to at least one sensing unit along the thickness direction; and the signal processing circuit module is electrically connected to the sensing unit.

18. The fingerprint living body identification device according to claim 16, wherein the signal processing circuit module is specifically used for:

determining fitted light intensity information of the pixel point corresponding to each modulation unit based on light intensity information of pixel points corresponding to a plurality of non-modulation units around each modulation unit after irradiated by the target light beam; and determining image information of the object to be detected based on the fitted light intensity information of the pixel point corresponding to each modulation unit, and the light intensity information of the pixel point corresponding to each non-modulation unit.

19. The fingerprint living body identification device according to claim 18, wherein the signal processing circuit module is specifically used for:

filtering the light intensity information of the pixel points corresponding to at least one non-modulation unit around any one modulation unit based on a smoothing filtering method, so as to obtain fitted light intensity information of the pixel point corresponding to said any one modulation unit.

20. The fingerprint living body identification device according to claim 16, wherein the signal processing circuit module is further specifically used for:

inputting an initial image obtained by the spectral imaging chip from the pixel points corresponding to all of the non-modulation units after irradiated by the target light beam into a fitting model to obtain image information of the object to be detected output by the fitting model; and the fitting model is constructed based on an adversarial neural network, and the fitting model is obtained by training based on a missing sample image with blank pixels and a complete sample image without blank pixels corresponding to the missing sample image.

* * * * *